(12) United States Patent
Ohtaki et al.

(10) Patent No.: US 6,449,095 B1
(45) Date of Patent: Sep. 10, 2002

(54) OPTICAL PICKUP

(75) Inventors: Sakashi Ohtaki; Noriaki Murao, both of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/665,075

(22) Filed: Sep. 19, 2000

(30) Foreign Application Priority Data

Sep. 21, 1999 (JP) .......................................... 11-266434

(51) Int. Cl.⁷ .......................... G02B 27/44; G02B 5/18; G11B 7/00
(52) U.S. Cl. ........................ 359/566; 359/571; 369/112; 369/109; 369/103
(58) Field of Search ................................. 359/565, 566, 359/569, 571; 369/103, 122, 112, 109, 44.12

(56) References Cited

U.S. PATENT DOCUMENTS 6,084,843 A * 7/2000 Abe et al. .................... 369/112

6,181,668 B1 * 1/2001 Kajiyama et al. ........... 369/112

* cited by examiner

Primary Examiner—Audrey Chang
(74) Attorney, Agent, or Firm—Morgan, Lewis & Bockius LLP

(57) ABSTRACT

An optical pickup is disclosed which includes a first light source for emitting a first beam of light with a first wavelength; a second light source for emitting a second beam of light with a second wavelength, longer than the first wavelength; a condenser lens for condensing the first and second beam of light onto an information recording surface of a recording medium; and a diffractive optical element arranged in an optical path from the first and second light source to the condenser lens. The condenser lens condenses, for the first beam of light, a refracted beam of the first diffraction order of the first beam of light by means of the diffractive optical element as an information read beam or an information write beam. For the second beam of light, the condenser lens condenses a refracted beam of the second diffraction order, lower than the first diffraction order, of the second beam of light by means of the diffractive optical element as an information read beam or an information write beam.

10 Claims, 21 Drawing Sheets

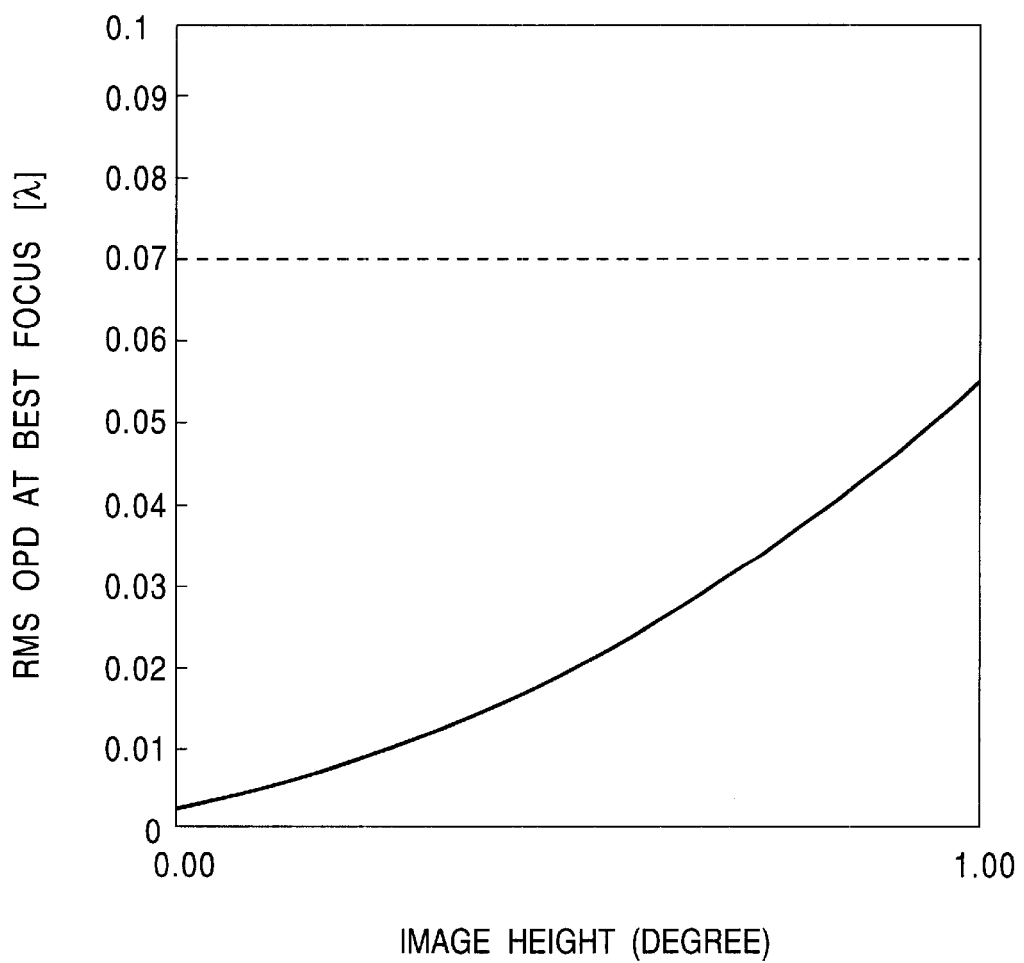

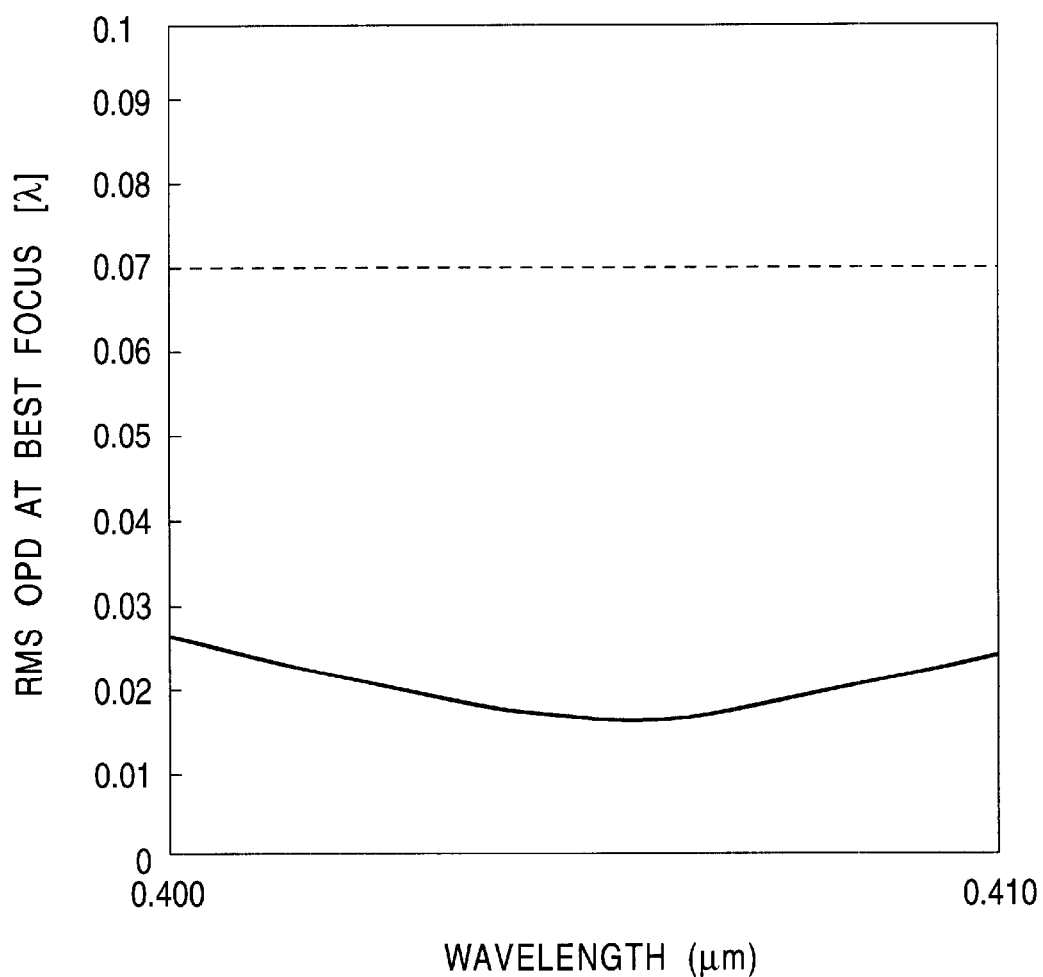

OPTICAL PICKUP

BACKGROUND OF THE INVENTION

1. Field of the Invention

The present invention relates to an optical system used in an optical read/write device for reading or writing information on optical discs employing different wavelengths. More particularly, it relates to an optical pickup that provides compatibility with DVDs and HD-DVDs, which employ laser sources of different wavelengths.

2. Description of the Related Art

Optical read/write devices include an optical disc player that can read information recorded on optical discs or optical recording media such as DVDs (Digital Versatile Discs). Some DVDs come in 4.7 GB but highly denser package media are demanded and under development. As well known, it is effective to provide the package media with a light source of shorter wavelength and an objective lens of a higher NA (numeral aperture) to improve recording density. As for the light source of a shorter wavelength, short wavelength semiconductor lasers with a GaN substrate employed as the base are being developed and nearing practical use. The laser under development has a wavelength of 405 nm and a high density DVD (HD-DVD) system, employing the laser, with about 15 GB is also being developed.

Accordingly, these DVDs and HD-DVDs require a compatible disc player that can read information recorded thereon, and the reproduction system thereof should be able to reproduce DVDs. What is raised as a problem here is that a laser of a short wavelength cannot read a two-layered disc among DVD discs. This is resulted from the fact that the intermediate layer of the two-layered disc has a low reflection coefficient for a beam of light of a short wavelength. Accordingly, to implement a compatible disc player, it is necessary to provide the HD-DVD system with a laser that emits a red beam (hereinafter also simply referred to as red) with a wavelength of around 650 nm in addition to a blue beam (hereinafter also simply referred to as blue) with a wavelength of around 405 nm. Conventional DVDs have a substrate 0.6 mm in thickness, a wavelength of from 635 nm to 655 nm, and the numerical aperture of an objective lens of about 0.6, while HD-DVDs have a substrate 0.6 mm in thickness, a wavelength of 405 nm, and the numerical aperture of an objective lens of about 0.6.

However, it is difficult to condense both beams of light having different wavelengths by means of conventional single lenses without substantial aberration because of chromatic aberration of the objective lens. Thus, this requires some thought to ensure compatibility between DVDs and HD-DVD.

It is conceivable to switch between dedicated objective lenses for each of the wavelengths in use in order to implement an optical pickup for a compatible player of DVDs and HD-DVDs. However, this requires two objective lenses and therefore a complicated lens switching mechanism. This increases cost and the actuator in size, providing a disadvantage to a reduction in size. Alternatively, the objective lens and the collimator lens can be conceivably combined with each other. However, this configuration would make it difficult to maintain the performance for displacing the objective lens since the collimator is fixed relative to the objective lens.

In either case, dedicated optical systems, which are provided with prisms or lenses and a plurality of light sources to ensure compatibility between DVDs and HD-DVDs, would tend to result in a complicated and large optical pickup or entire optical head.

SUMMARY OF THE INVENTION

The present invention was developed in view of the aforementioned problems. An object of the present invention is to provide an optical pickup that is suitable for a decrease in size and can read and write information on optical discs or recording surfaces available for different wavelengths.

The optical pickup according to the present invention comprises a first light source for emitting a first beam of light with a first wavelength and a second light source for emitting a second beam of light with a second wavelength, longer than the first wavelength. The optical pickup also comprises a condenser lens for condensing the aforementioned first and second beam of light onto an information recording surface of a recording medium; and a diffractive optical element having a corrugation arranged in an optical path from the aforementioned first and second light source to the aforementioned condenser lens. The optical pickup is characterized in that the aforementioned condenser lens condenses, for the aforementioned first beam of light, a refracted beam of the first diffraction order of the first beam of light by means of the aforementioned diffractive optical element as an information read beam or an information write beam. In addition, for the aforementioned second beam of light, a refracted beam of the second diffraction order, lower than the aforementioned first diffraction order, of the second beam of light is condensed by means of the aforementioned diffractive optical element as an information read beam or an information write beam.

The optical pickup according to the present invention is characterized in that the aforementioned diffractive optical element has the shape of saw teeth in cross section of the corrugation.

Alternatively the optical pickup according to the present invention is characterized in that the aforementioned diffractive optical element has the shape of steps in cross section of the corrugation.

The optical pickup according to the present invention is characterized in that an absolute value of the aforementioned first diffraction order of the diffracted beam of the aforementioned first beam of light is greater by one than an absolute value of the aforementioned second diffraction order of the diffracted beam of the aforementioned second beam of light, and the absolute value of the aforementioned second diffraction order of the diffracted beam of the aforementioned second beam of light is not less than one.

The optical pickup according to the present invention is characterized in that the diffracted beam of the aforementioned second beam of light is a primary diffracted beam when the diffracted beam of the aforementioned first beam of light is a secondary diffracted beam, or the diffracted beam of the aforementioned second beam of light is a secondary diffracted beam when the diffracted beam of the aforementioned first beam of light is a tertiary diffracted beam.

The optical pickup according to the present invention is characterized in that a depth of the corrugation of the aforementioned diffractive optical element lies within a range of 1.42 micrometers +/−0.2 micrometers or 2.40 micrometers +/−0.2 micrometers.

The optical pickup according to the present invention is characterized in that a pitch of the corrugation of the aforementioned diffractive optical element is 20 micrometers or greater.

The optical pickup according to the present invention is characterized in that the aforementioned first wavelength lies in a range of from 400 nm to 410 nm and the aforementioned second wavelength lies in a range of from 630 nm to 660 nm.

The optical pickup according to the present invention is characterized in that the aforementioned diffractive optical element has a plano-concave lens and the aforementioned diffractive optical element is formed on the concave surface of the plano-concave lens.

The optical pickup according to the present invention is characterized in that the aforementioned diffractive optical element is formed integrally with the aforementioned condenser lens and the corrugation of the aforementioned diffractive optical element is formed on a surface of the aforementioned condenser lens, the surface being oriented towards the light sources.

BRIEF DESCRIPTION OF THE DRAWINGS

These and other objects and advantages of the present invention will become clear from the following description with reference to the accompanying drawings, wherein:

FIG. 17 is a plot illustrating a change in wave front aberration with respect to the angle of view of a second wavelength of secondary diffracted light, provided by the objective lens unit according to the second embodiment;

FIG. 19 is a plot illustrating a change in wave front aberration with respect to a first wavelength of secondary diffracted light, provided by the objective lens unit according to the third embodiment;

DETAILED DESCRIPTION OF THE PREFERRED EMBODIMENTS

The embodiments of the present invention will be described below with reference to the accompanying drawings.

Optical Pickup

Figure 1:
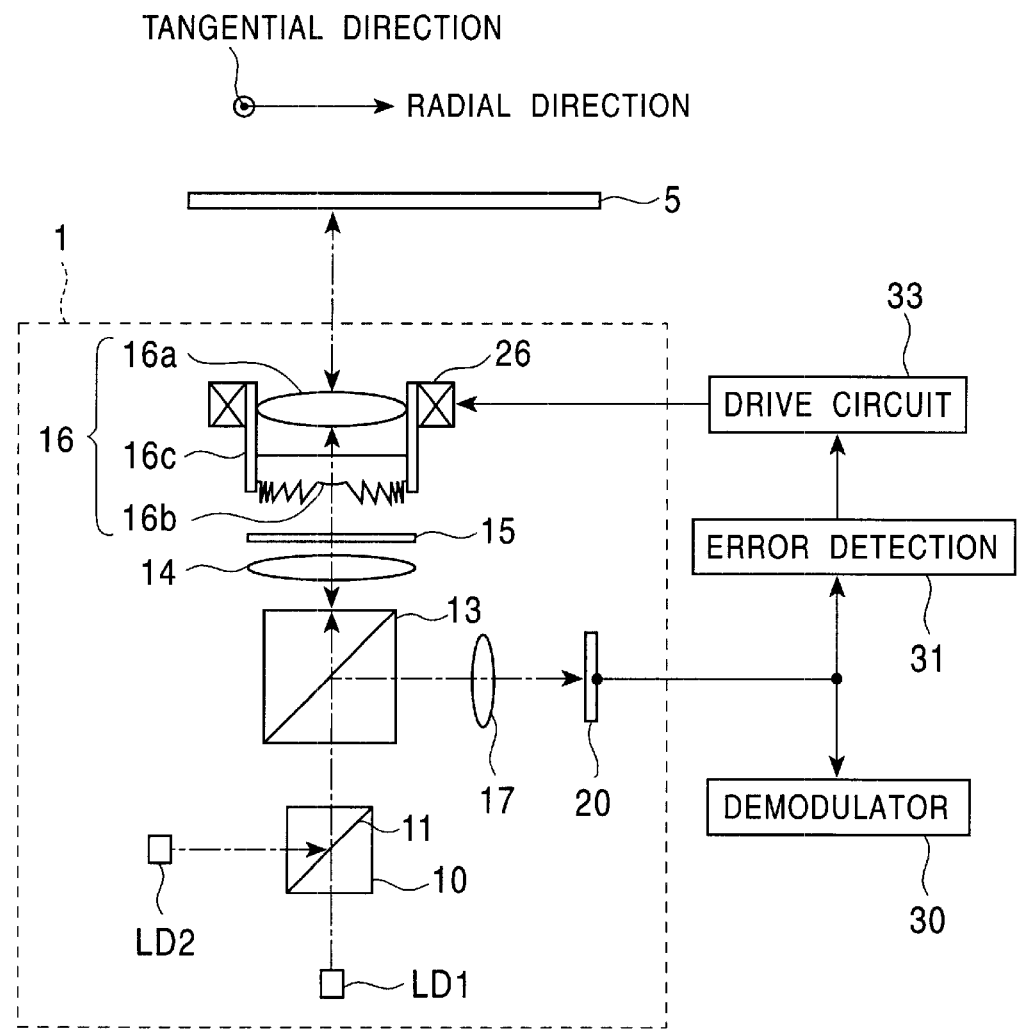
FIG. 1 is a schematic view illustrating the configuration of the inside of an optical pickup according to the present invention.

FIG. 1 is a schematic view illustrating an optical pickup according to one embodiment. The optical pickup includes an HD-DVD semiconductor laser LD1 for emitting blue with a short first wavelength of from 400 nm to 410 nm, preferably around 405 nm. The optical pickup also includes a DVD semiconductor laser LD2 for emitting red with a long second wavelength of from 630 nm to 660 nm, preferably around 650 nm for DVDs, which is longer than the first wavelength. The semiconductor lasers LD1 and LD2 are switched over and then lit for use with either the HD-DVD or the DVD.

Moreover, the optical pickup includes an optical axis coupler element or an optical axis coupler prism (color combining prism) 10 for providing a common optical path for the first and second beams of light, that is, the red and blue light. As shown in FIG. 1, the optical axis coupler prism 10 of this optical system is designed to provide a common optical path for the diverging light beams of the semiconductor lasers LD1 and LD2. Thus, the optical axis coupler prism 10 is provided with a function for allowing the optical axes of the laser beams with the two wavelengths to be substantially aligned with each other. A dichroic mirror 11 in the optical axis coupler prism 10 has such a property as to transmit the first laser beam with a wavelength of 405 nm but reflect the second laser beam with a wavelength of 650 nm. Moreover, the dichroic mirror 11 is made of a multi-layered dielectric thin film so as to have the dependence of angle of incidence. In addition, the optical axis coupler element for coupling the optical axes is not limited to the optical axis coupler prism. That is, instead of the dichroic mirror, a diffraction grating employing a difference in diffraction angle caused by different wavelengths or a liquid crystal cholesteric layer or the like may be used as the optical axis coupler element.

Furthermore, the optical pickup is provided, in the downstream parts of the optical axis of the optical axis coupler prism 10, with a polarization beam splitter 13, a collimator lens 14, a quarter-wave plate 15, and an objective lens unit 16. With this optical system for illuminating light, a laser beam emitted from either the first semiconductor laser LD1 or the second semiconductor laser LD2 is collimated by the collimator lens 14 via the optical axis coupler prism 10 and the polarization beam splitter 13. Then, the beam is transmitted from the quarter-wave plate 15 and then condensed towards an optical disc 5 placed in the vicinity of the focal point thereof, forming an optical spot on a pit array of the information recording surface of the optical disc 5.

In addition to the above optical system for illuminating light, the optical pickup includes an optical system for detecting light such as a detection lens 17. The objective lens unit 16, the quarter-wave plate 15, and the polarization beam splitter 13 are also used in the optical system for detecting light. A beam of light reflected from the optical disc 5 of the HD-DVD or the DVD is collected by the objective lens unit 16 and then directed towards the detection lens 17 for condensing and detecting light by means of the polarization beam splitter 13 via the quarter-wave plate 15. The condensed light collected by the detection lens 17 is transmitted, for example, by an astigmatizer (not shown) such as a cylindrical lens or a multi-lens. Then, the light forms an optical spot, for example, near the center of light-receiving surfaces 20 of a four-part split optical detector having four light-receiving surfaces which are provided by splitting the detector in four by two lines that are orthogonal to each other.

In addition, the light-receiving surfaces 20 of the optical detector are coupled to a demodulator circuit 30 and an error detector circuit 31. The error detector circuit 31 is coupled to a drive circuit 33 for performing the tracking control of the objective lens unit and driving a mechanism including actuators 26 used for focus control.

The four-part split optical detector supplies an electric signal, corresponding to an optical spot image formed near the center of the light-receiving surfaces 20, to the demodulator circuit 30 and the error detector circuit 31. The demodulator circuit 30 generates a write signal in accordance with the electric signal. The error detector circuit 31 generates a focus error signal, a tracking error signal, and other servo signals in accordance with the electric signal. The error detector circuit 31 supplies the respective drive signals to each of the actuators via the drive circuit 33 of the actuators. These perform servo control drive on the objective lens unit 16 and the like in accordance with the respective drive signals.

Objective Lens Unit

As shown in FIG. 1, the objective lens unit of the optical pickup according to the present invention uses two light sources, that is, the blue laser source LD1 of a short wavelength for HD-DVDs and the red laser source LD2 of a long wavelength for DVDS. Beams of light emitted from these sources are joined in one optical path with the optical axis coupler prism 10 and are condensed on the write surface of the optical disc of either the HD-DVD or the DVD by means of the objective lens unit 16. As shown in FIG. 1, the objective lens unit 16 is a composite objective lens assembly that is incorporated with a condenser lens (a reference lens) 16a for condensing a beam of light on the write surface and a diffractive optical element (DOE) 16b. Here, the diffractive optical element 16b has a diffraction grating such as a Fresnel lens or a hologram lens that is provided with a plurality of protrusions and recesses as a corrugation on an optically transparent plate. The condenser lens 16a and the diffractive optical element 16b are arranged on the same optical axis by means of a holder 16c. The diffractive optical element 16b having a diffraction grating is located on the light source side or in the optical path between the optical axis coupler prism 10 and the condenser lens 16a.

The condenser lens 16a employs an aspheric lens the aberration of which is compensated for within the blue wavelength range from 400 nm to 410 nm or within the red wavelength range from 630 nm to 660 nm or at least within the wavelength range of blue. In general, aberration is normalized with wavelength and provides less tolerance inversely with wavelength, so that it is more difficult to obtain a desirable property with the blue wavelength than with the red wavelength. Thus, it is particularly desirable to employ an aspheric lens the aberration of which is compensated for within the blue wavelength.

Figure 2:
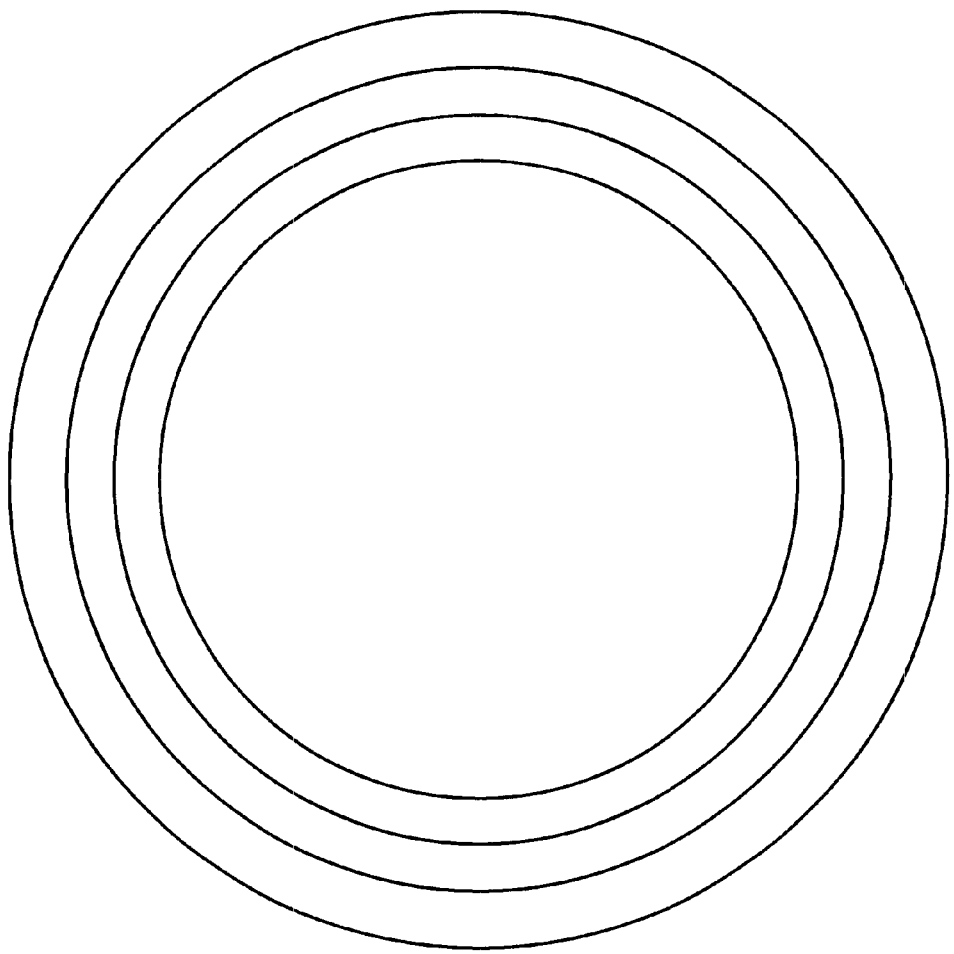
FIG. 2 is a plan view illustrating a diffraction grating in an optical pickup according to the present invention.
Figure 3:
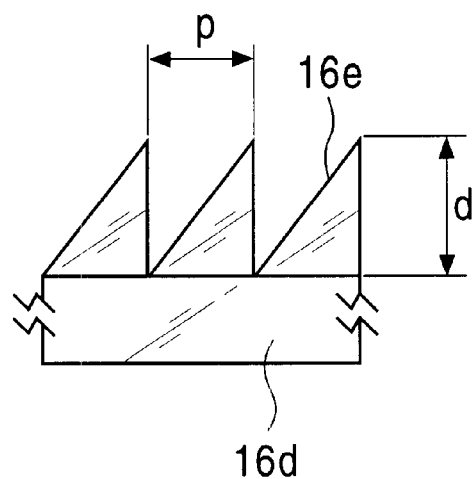
FIG. 3 is a partially cross-sectional view illustrating a diffraction grating in an optical pickup according to the present invention.
Figure 4:
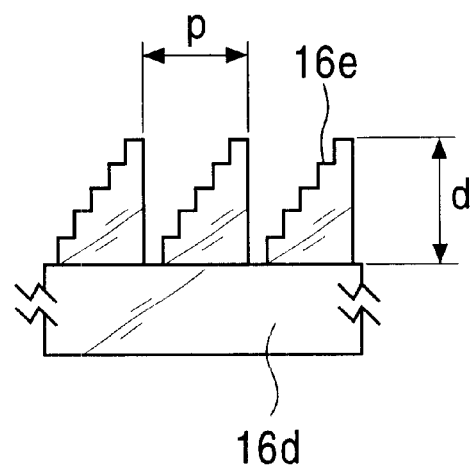
FIG. 4 is a partially cross-sectional view illustrating a diffraction grating in an optical pickup according to the present invention.

The diffractive optical element 16b is made of glass or plastics. As shown in FIG. 2, the diffraction grating 16e of the diffractive optical element 16b is made up of a plurality of annular grooves or convex orbicular zones, cut or deposited by photolithography concentrically about the optical axis. As shown in FIG. 3, the diffraction grating 16e is formed in the shape of blazes or saw teeth in cross section. Alternatively, the diffraction grating 16e may be formed in the shape of steps, as shown in FIG. 4. For example, the diffraction grating having a saw tooth cross section offers the advantage of higher diffraction efficiency over those having other shapes. The methods for forming the cross-sectional shape of diffraction grating include photolithography and precision cutting with diamond bit. Any one of these methods may be used to form a diffraction grating in the shape of a multi-stage blaze the blaze of which is formed in an approximation manner or in the shape of a blaze. Alternatively, it is also possible to form the shape of the multi-stage blaze or the blaze into a pattern on a mold, thereby allowing a plurality of diffractive optical elements to be replicated with a transparent material by the injection molding or the so-called 2P method.

As shown in FIGS. 3 and 4, the diffractive optical element 16b comprises a plano-concave lens 16d, and diffraction grating 16e that is formed on the concave surface of the plano-concave lens. The substrate of the diffractive optical element 16b is formed of a concave lens because the property of the condenser lens 16a with the optimal image point being fixed is improved with a concave lens but deteriorated with a convex lens in terms of the frequency dependence property, which is described later. In addition, it is also possible to employ, as a diffractive optical element, an assembly having the optically transparent flat plate 16d as a substrate instead of the plano-concave lens 16d and the diffraction grating 16e formed on the surface thereof.

Figure 5A:
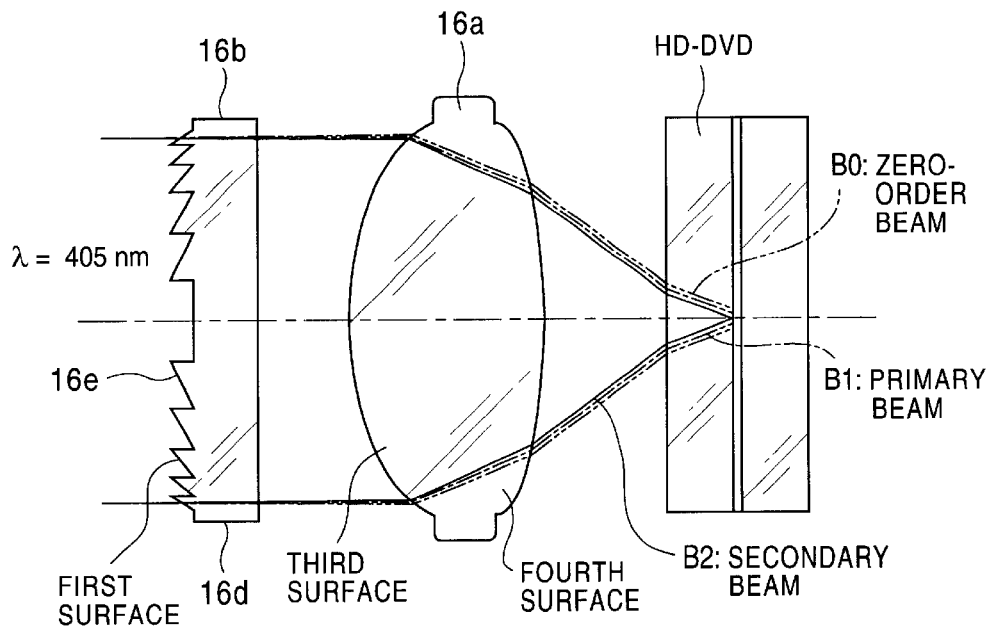
FIGS. 5A and 5B are cross-sectional views each illustrating an objective lens unit in an optical pickup according to the present invention.
Figure 5B:
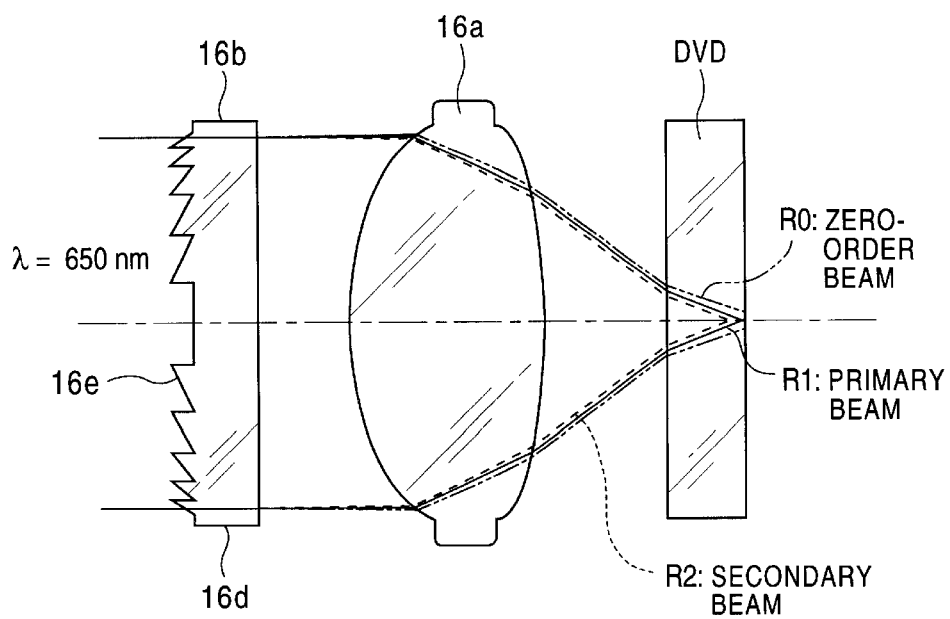

For example, consider a case where the first blue laser beam with a wavelength of 405 nm passes through the diffraction grating 16e of the diffractive optical element 16b, as shown in FIG. 5(A). The diffraction grating 16e is adapted to condense a secondary diffracted beam of light B2 as an information read beam or an information write beam onto the write surface of the HD-DVD disc via the condenser lens 16a. Consider another case where the second red laser beam with a wavelength of 650 nm passes through the diffraction grating 16e, as shown in FIG. 5(B). The diffraction grating 16e is also adapted to condense a primary diffracted beam of light R1 as an information read beam or an information write beam onto the write surface of the DVD disc via the objective lens. Here, the primary diffracted beam of light R1 is a lower order beam than the secondary diffracted beam of the first laser beam. In these cases, a red zero-order diffracted beam R0 and higher-order diffracted beams, and a blue zero-order diffracted beam B0 and the primary diffracted beam B1 are not in focus on the disc write surface, thus causing the diffracted beams to hardly affect reading or writing. In the aforementioned examples, the wavelength of the first and second beam, that is, the blue and red semiconductor lasers or the light sources lie within the range of from 630 nm to 660 nm for red and the range of from 400 nm to 410 nm for blue. This is because the diffraction efficiency would not largely vary within these ranges. In addition, the first diffraction order of the diffracted beam of the first laser beam is preferably greater than the second diffraction order of the diffracted beam of the second laser beam by one. Moreover, the second diffraction order of the diffracted beam of the second laser beam is preferably not less than one. In the aforementioned examples, the diffracted beam of the second laser beam is the primary diffracted beam when the diffracted beam of the first laser beam is the secondary diffracted beam. In addition to this, the diffraction grating 16e of the diffractive optical element 16b can be adapted to condense the secondary diffracted beam on the DVD as the diffracted beam of the second laser beam with a wavelength of 650 nm when the tertiary diffracted beam with a wavelength of 405 nm is used as the diffracted beam of the first laser beam for the HD-DVD.

In general, a compatible optical pickup employs a zero-order diffracted beam, that is, a powerless diffraction grating to provide the read beam with optical strength on one hand and a diffracted beam other than the zero-order diffracted beam for the read beam on the other hand. However, the diffraction grating according to the present invention is adapted to use not the zero-order diffracted beam of red and blue, but the blue secondary diffracted beam and the red primary diffracted beam, which is lower in order by one than the secondary. That is, in the diffraction grating according to the present invention, a difference in optical path length thereof is adapted to provide high diffraction efficiency for each of the diffraction orders required of red and blue wavelengths.

For example, consider a case where the diffraction grating, shown in FIG. 3, having the shape of a blaze in cross section is allowed to vary pitch P from 160 to 260 micrometers and depth d from 0 to 3 micrometers. In this case, the base material is of a plastic material such as OZ-1000 (manufactured by Hitachi Chemical Co., Ltd.). With the diffractive optical element configured as such, a variation in diffraction efficiency of the diffraction grating is determined.

The diffraction grating according to the embodiment has a pitch sufficiently longer than the wavelength and thus the scalar theory can be applied thereto. In addition, the diffraction grating has a depth substantially equal to the wavelength and thus can be treated as a so-called thin film grating. In this case, the diffraction efficiency ηm is expressed by the following equation (where m is the order of diffraction).

$$\eta m = \left| \frac{1}{T} \int_0^T A(x) \exp\{i\varphi(x)\} \exp\left(-i\frac{2\pi mx}{T}\right) dx \right|^2$$

In the above equation, $A(x)$ is a transmitted amplitude distribution, $\psi(x)$ is a phase distribution, and T is the pitch of the grating. In the calculation, $A(x)$ is normalized as $A(x)=1$.

In general, the wavelength dependence of aberration is more improved as the pitch of the diffraction grating becomes finer. However, the diffraction efficiency is significantly reduced in principle when the pitch becomes five times or less than the wavelength. In addition, a shift in shape would affect the efficiency more seriously as the pitch becomes finer. Accordingly, this embodiment employs a pitch of 20 micrometers or more as a desirable value, 1 micrometer shift in shape of which corresponds to a 5% shift in shape of the pitch.

Figure 6:
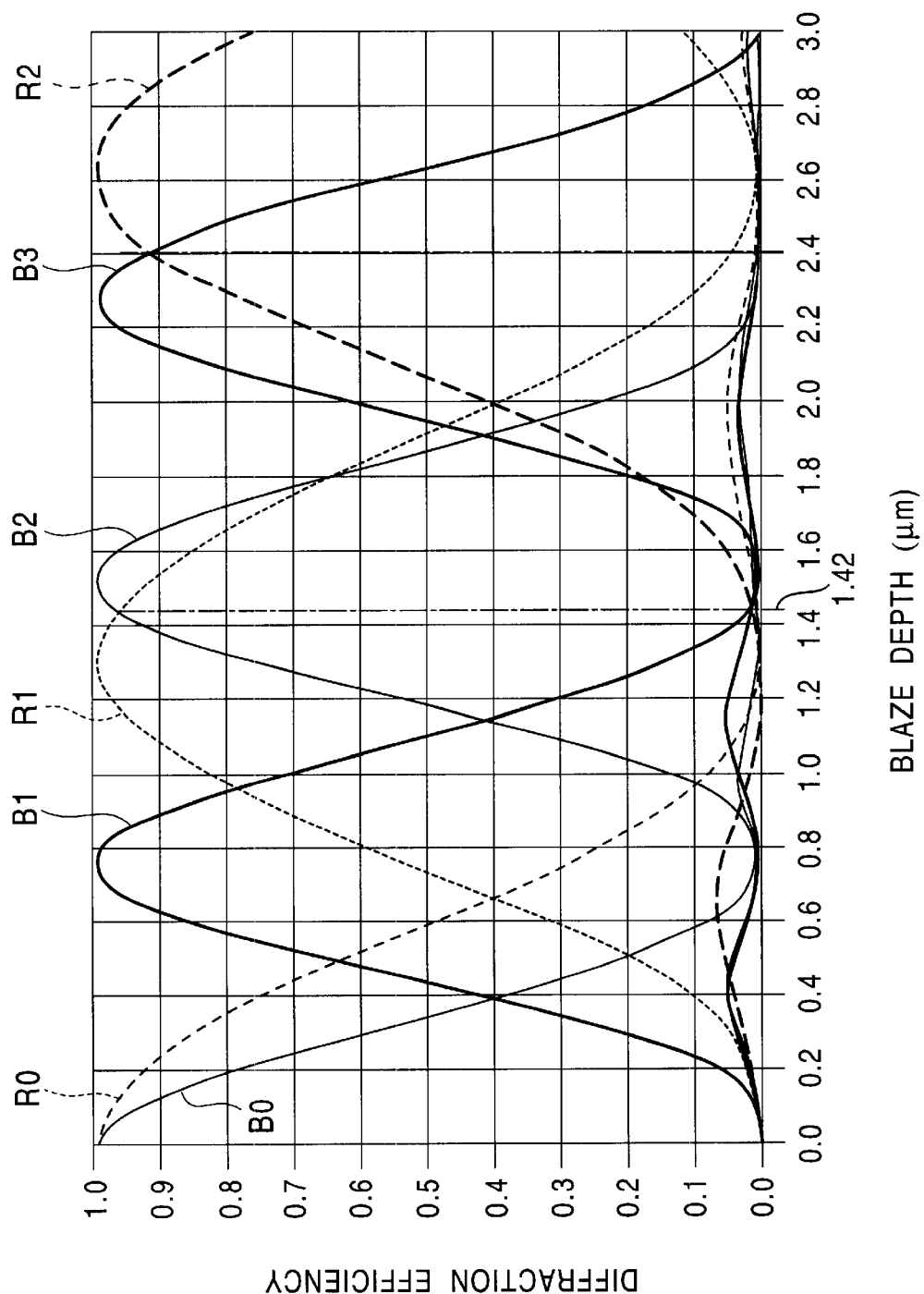
FIG. 6 is a plot illustrating the relationship between the depth and diffraction efficiency of a diffraction grating provided for an objective lens unit in an optical pickup according to the present invention.

FIG. 6 plots the resulting variation in diffraction efficiency with the horizontal axis representing the depth d of the diffraction grating and the vertical axis representing the diffraction efficiency thereof. In the figure, "B0", "B1", "B2", and "B3" show the blue diffraction efficiency of the zero-order, the primary, the secondary, and the tertiary diffracted beams, while "R0", "R1", and "R2" show the red diffraction efficiency of the zero-order, the primary, and the secondary diffracted beams.

As obvious from FIG. 6, the blazed diffraction grating provides the maximum diffraction efficiency for the phase depth in a cycle of one wavelength λ of light. The phase depth of the diffraction grating is expressed by d(n−1) ,where d is the depth of an actual diffraction grating and n is the refractive index of the base material of the refractive optical element. The refractive index of the base material nB=1.531 for the wavelength λ=405 nm and nR=1.498 for the wavelength λ=650 nm. Thus, calculation gives the depth of the diffraction grating 0.763 micrometers at a phase difference of one wavelength λ for 405 nm, and thus the depth provides the maximum diffraction efficiency of the blue primary diffracted beam. The maximum diffraction efficiency of the blue secondary diffracted beam is given at the depth of 1.526 micrometers, two times as large as the aforementioned value. Likewise, the maximum diffraction efficiency of the red primary diffracted beam is given at the depth of 1.305 micrometers.

From the foregoing, it can be seen that the depths of the diffraction grating given at the intersections of R1 and B2, and R2 and B3 provide high diffraction efficiency for either the blue or the red wavelength. That is, the depth of the diffraction grating by which high diffraction efficiency is given lies at around 1.42 micrometers that is used for the secondary diffracted beam B2 of the first blue wavelength and the primary diffracted beam R1 of the second red wavelength. The depth also lies at around 2.4 micrometers that is used by the blue tertiary diffracted beam B3 and the red secondary diffracted beam R2. A shift of 0.2 micrometers in the depth of the diffraction grating would cause a decrease of around 10% in the efficiency. To ensure efficiency greater than that, the depth of the diffraction grating by which high diffraction efficiency is given should be preferably within 1.42 micrometers +/−0.2 micrometers or 2.4 micrometers +/−0.2 micrometers.

Furthermore, as can be seen from FIG. 6, the intersection of the primary diffracted beam B1 of the first blue laser beam and the primary diffracted beam R1 of the second red wavelength (at which the depth of the diffraction grating is 0.965 micrometers) gives about 80% of diffraction efficiency. This diffraction efficiency is not necessarily low, however, only a slight shift in the depth of the diffraction grating would cause a significant decrease in the diffraction efficiency. The peaks of diffraction efficiency provided by the blue secondary and tertiary diffracted beams are given at the depths of 1.526 micrometers and 2.289 micrometers. Likewise, for the red primary and secondary diffracted beams, peaks are given at the depths of 1.305 micrometers and 2.610 micrometers. Accordingly, a shift in the depth of diffraction grating would cause only a slight variation in diffraction efficiency at an intersection near the peaks of the diffraction efficiency of blue and red. However, at an intersection apart from the respective peaks, the diffraction efficiency would be significantly varied.

Embodiment 1

For example, an optical pickup provided with these functions was prepared as shown in FIGS. 5A and 5B. The optical pickup includes an objective lens unit in which a diffractive optical element is designed to be separate from a condenser lens and allow the diffraction grating to be symmetrical about the optical axis. Here, the diffractive optical element employs the secondary diffracted beam for blue (405 nm) and the primary diffracted beam for red (650 nm). The orbicular zone pattern of the diffraction grating, that is, the number of orbicular zones of the diffraction grating is five within the effective surface. The data of the radius and pitch is as shown in Table 1.

TABLE 1

| Orbicular zone No. | Radius (mm) | Pitch (mm) |
|---|---|---|
| 1 | 1.005975 | |
| 2 | 1.264028 | 0.258053 |
| 3 | 1.444862 | 0.180834 |
| 4 | 1.610726 | 0.165864 |
| 5 | 1.831136 | 0.220410 |

As shown in FIGS. 5A and 5B, the diffractive optical element comprising a plano-concave lens is arranged on the light source side of the aspheric condenser lens and a diffraction grating is formed on the concave surface thereof. Both of the concave surface and the diffraction grating are formed in an aspheric shape. Accordingly, first and second surfaces are the incident and transmitting surfaces of the diffractive optical element, and third and fourth surfaces are incident and transmitting surfaces of the condenser lens.

Each of the aspheric surfaces is expressed by the following equation;

$$Z = \frac{(1/R)r^2}{1+\sqrt{1-(1/R)^2(K+1)r^2}} + \sum_i ASi r^i$$

where Z is a quantity of SAG, R is a radius of curvature, K is a cone index, r is a radius from the optical axis, and ASi is an aspheric coefficient.

Phase function $\Phi(r)$ is expressed by the following equation;

$$\Phi(r) = dor2\pi/\lambda_0(DF0 + DF1r^2 + DF2r^4 + DF3r^6 + DF4r^8 + DF5r^{10})$$

where dor is a diffraction order, $\lambda_0$ is a wavelength, r is a radius from the optical axis, and DF1–DF5 are coefficients.

The data of the respective aspheric surfaces, which were automatically designed, are as shown in Tables 2–4.

TABLE 2

| | Surface No. | Radius of curvature | Surface interval | Refractive index |
|---|---|---|---|---|
| Diffractive optical | 1 | 280.370891V | 1.000000 | 1.518981 |
| | 2 | — | 0.300000 | |
| Reference lens | 3 | 2.164335 | 1.900000 | 1.605257 |
| | 4 | −16.344600 | 1.000000 | |
| Disc | 5 | — | 0.600000 | 1.621082 |
| | 6 | — | 0.875242V | |

TABLE 3

| | | First surface | Third surface | Fourth surface |
|---|---|---|---|---|
| Aspheric coefficient | AS2 | −0.001558 | 0.002689 | 0.008334 |
| | AS3 | 0.000155 | 0.000265 | −0.001575 |
| | AS4 | 3.9939e−05 | 5.0945e−06 | 0.000217 |
| | AS5 | −2.7633e−06 | 2.8945e−06 | −1.5435e−05 |
| Cone index (K) | | −8.1804e+04 | −0.685540 | −34.016419 |

TABLE 4

| | First surface |
|---|---|
| DF0 | −0.000200 |
| DF1 | 0.000225 |
| DF2 | −0.000491 |
| DF3 | 5.5800e−05 |
| DF4 | 8.1529e−06 |
| DF5 | −5.0055e−07 |

Figure 7:
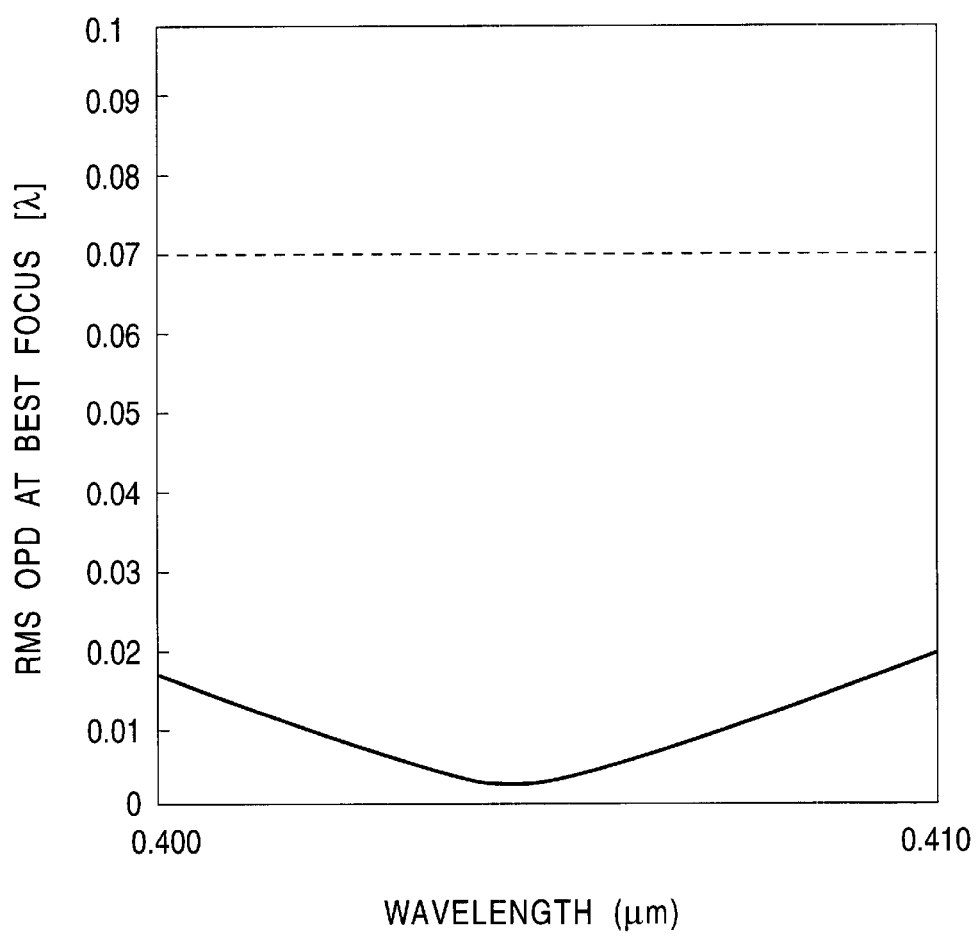
FIG. 7 is a plot illustrating a change in wave front aberration with respect to a first wavelength of secondary diffracted light, provided by an objective lens unit according to a first embodiment.

FIG. 7 illustrates a variation in wave front aberration of the resulting objective lens unit for the HD-DVD (with an optical disc 0.6 mm in thickness and a light source having a wavelength λ=405 nm +/−5 nm). The figure shows wavelength dependence with the horizontal axis representing the wavelength and the vertical axis representing the quantity of wave front aberration (rms (λ)) on the optical axis. As shown in the figure, the wave front aberration of the objective lens unit is limited to the Marechal's condition 0.07λ or less.

Figure 8:
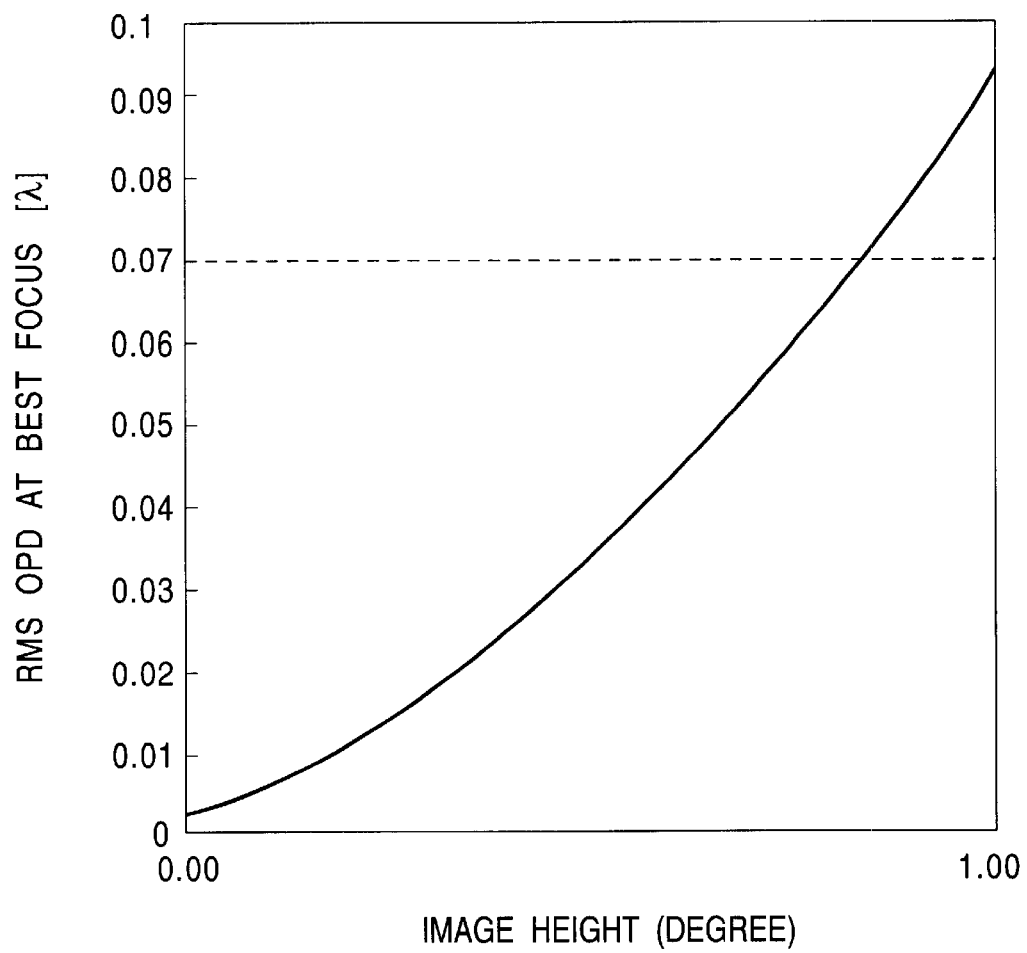
FIG. 8 is a plot illustrating a change in wave front aberration with respect to the angle of view of a first wavelength of secondary diffracted light, provided by the objective lens unit according to the first embodiment.

FIG. 8 is a plot with the horizontal axis representing the angle of view and the vertical axis representing the wave front aberration for a single wavelength of 405 nm. As shown in the figure, the wave front aberration of the objective lens unit is limited to the Marechal's condition 0.07λ or less up to about 0.8 degrees of angle of view.

Figure 9:
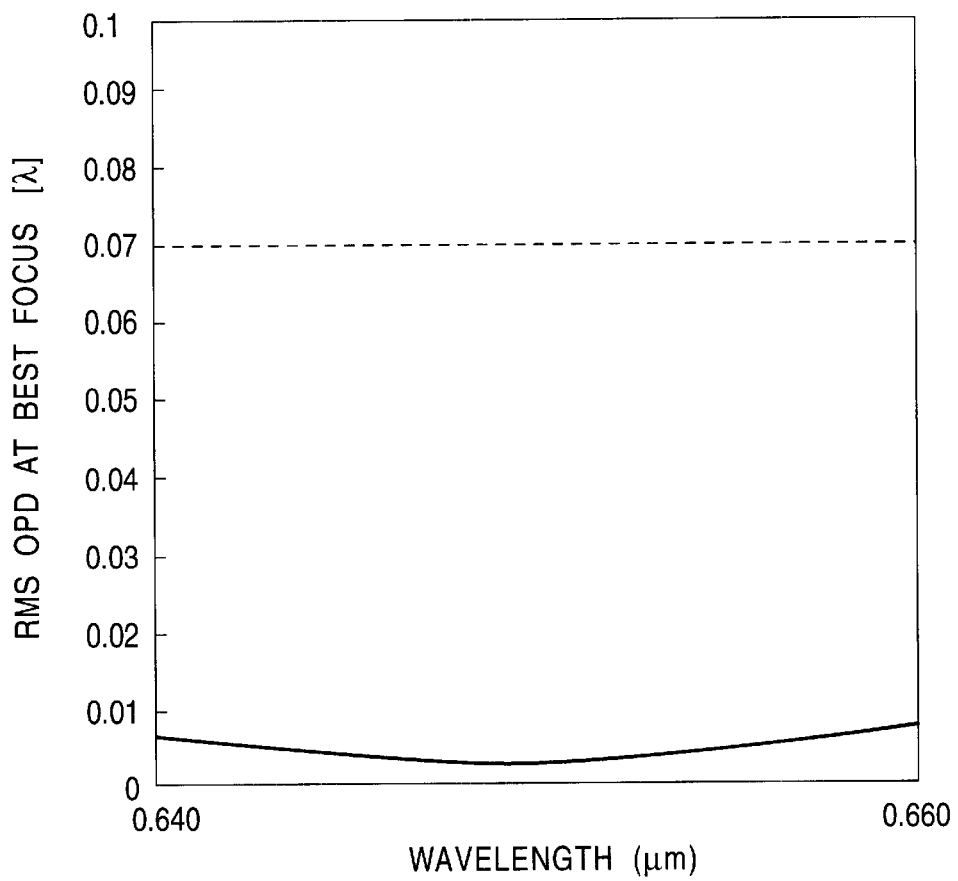
FIG. 9 is a plot illustrating a change in wave front aberration with respect to a second wavelength of primary diffracted light, provided by the objective lens unit according to the first embodiment.

FIG. 9 shows a variation in wave front aberration of the resulting objective lens unit for the DVD (with an optical disc 0.6 mm in thickness and a light source having a wavelength λ=650 nm +/−10 nm). The figure shows wavelength dependence with the horizontal axis representing the wavelength and the vertical axis representing the quantity of wave front aberration (rms (λ)) on the optical axis. As shown in the figure, the wave front aberration of the objective lens unit is limited to significantly below the Marechal's condition 0.07λ.

Figure 10:
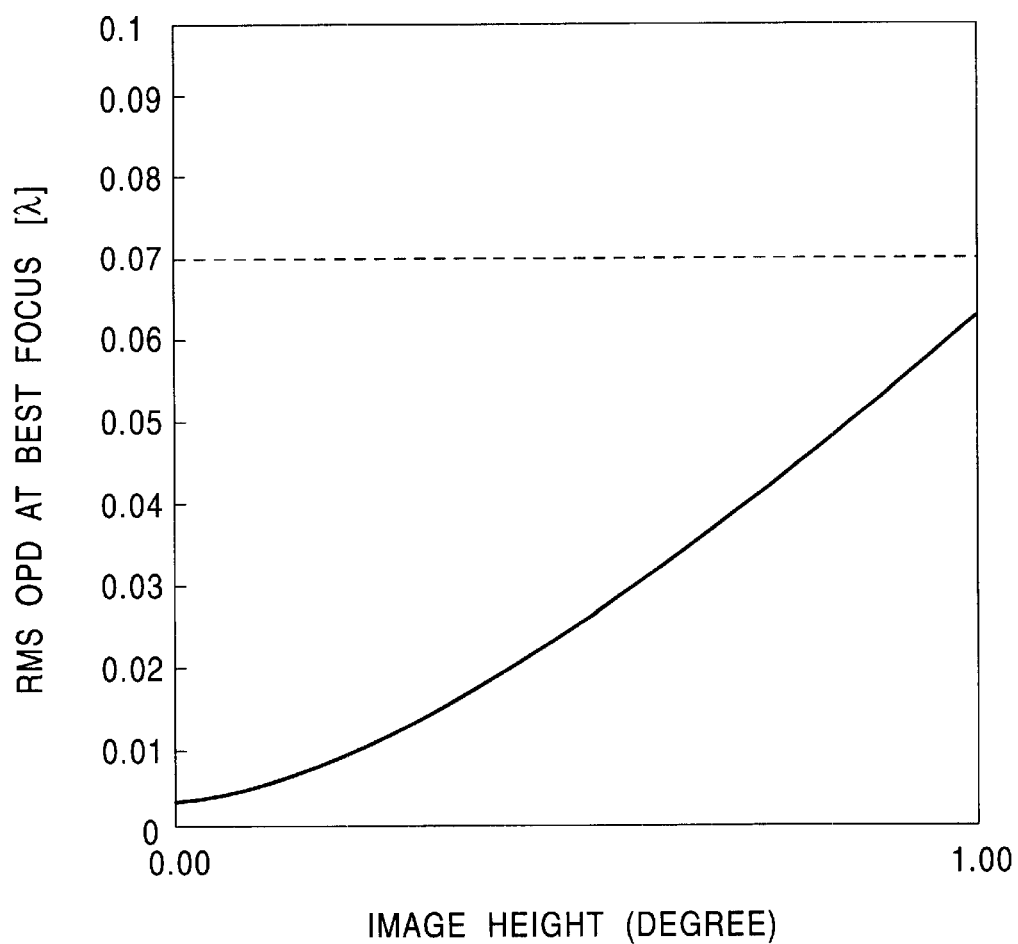
FIG. 10 is a plot illustrating a change in wave front aberration with respect to the angle of view of a second wavelength of primary diffracted light, provided by the objective lens unit according to the first embodiment.

FIG. 10 is a plot with the horizontal axis representing the angle of view and the vertical axis representing the wave front aberration for a single wavelength of 650 nm. As shown in the figure, the wave front aberration of the objective lens unit is limited to the Marechal's condition 0.07λ or less within one degree of angle of view.

Figure 11:
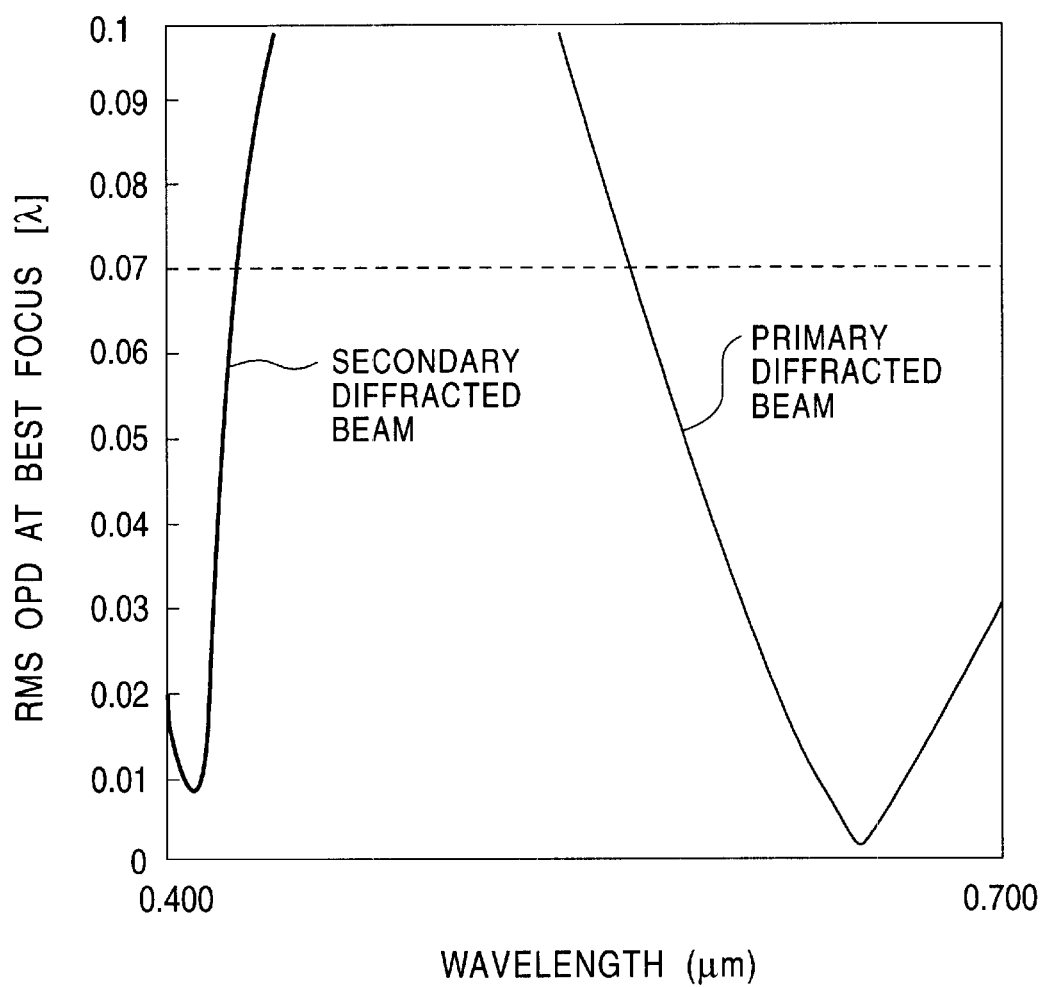
FIG. 11 is a plot illustrating a change in wave front aberration with respect to a second wavelength of primary diffracted light and a first wavelength of secondary diffracted light, provided by the objective lens unit according to the first embodiment.

Incidentally, FIG. 11 is a plot showing a variation in wave front aberration of the primary and secondary diffracted beams of the respective wavelengths of FIGS. 7 and 9, with the horizontal axis representing the wavelength from 400 nm to 700 nm and the vertical axis representing the wave front aberration. Incidentally, with FIGS. 7 to 11, the position of the best image point was determined for each of the wavelengths to calculate the quantity of wave front aberration, thus evaluating the wave front aberration (that is, variable points of the best image point).

Figure 12:
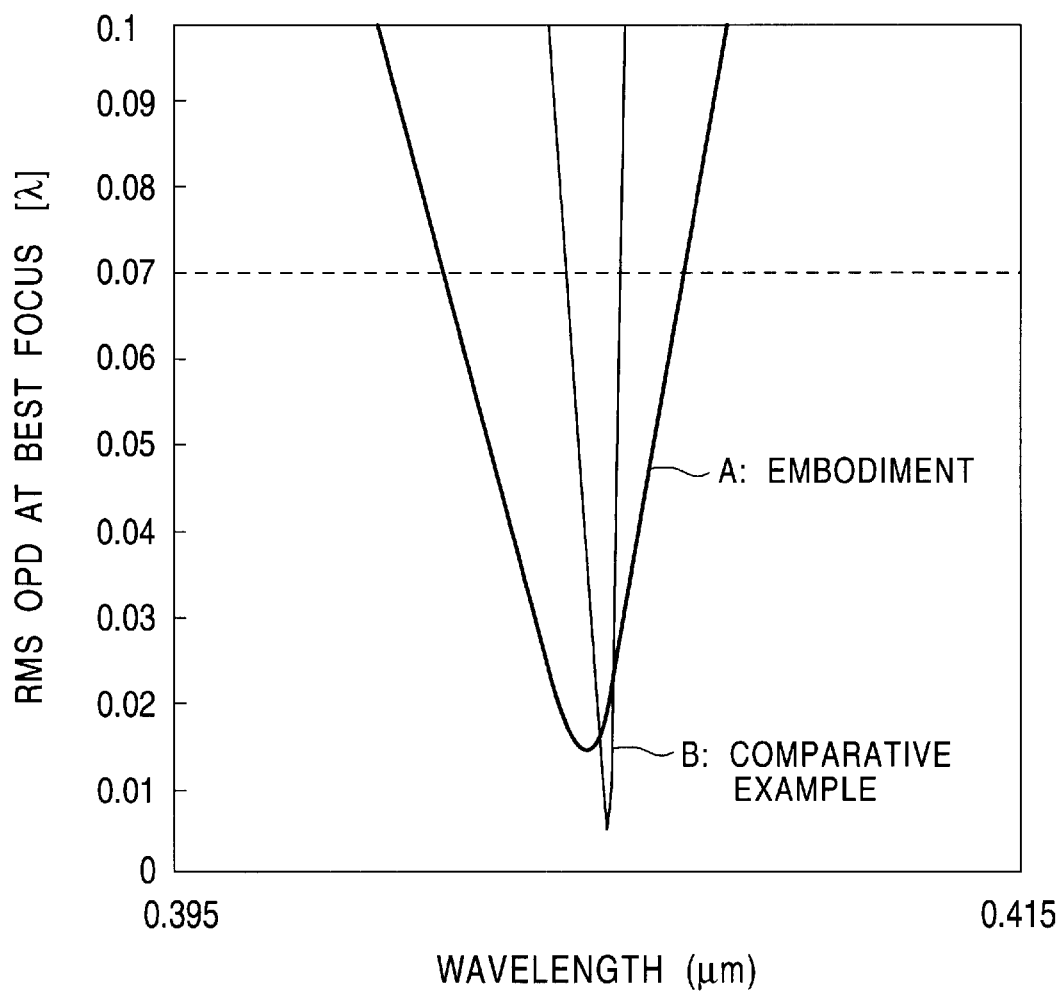
FIG. 12 is a plot illustrating a change in wave front aberration with respect to a first wavelength of secondary diffracted light, provided by the objective lens unit according to the first embodiment, also illustrating a change in wave front aberration of an objective lens dedicated only for a first wavelength according to a comparative example.

Furthermore, the wavelength dependence property of the objective lens itself, dedicated only to blue, was measured to compare with the aforementioned embodiment. FIG. 12 shows the result of the comparison. In the plot, reference symbol A shows the relationship between the wavelength and the aberration of the blue secondary diffracted beam of this embodiment, while reference symbol B shows the relationship between the wavelength and the aberration with the single objective lens for blue according to the comparative example. From the figure, it can be seen that this embodiment provides a wider range of frequency available than the single dedicated lens. This is resulted from the use of the concave lens (the plano-concave lens) as the diffractive optical element, thereby providing a more improved wavelength dependence property than that of the single objective lens dedicated to blue. Incidentally, in FIG. 12, the position of the best image point was determined with one wavelength to calculate the quantity of wave front aberration for other wavelengths with the best image point being fixed thereto, thus evaluating the wave front aberration (that is, variable points of the best image point). Depending on the wavelength, the best image point that gives the minimum wave front aberration is varied. Therefore, the fixed position of the best image point of FIG. 12 always provides a more rigorous condition than the variable position of the best image point of FIGS. 7 and 11.

Embodiment 2

Figure 13A:
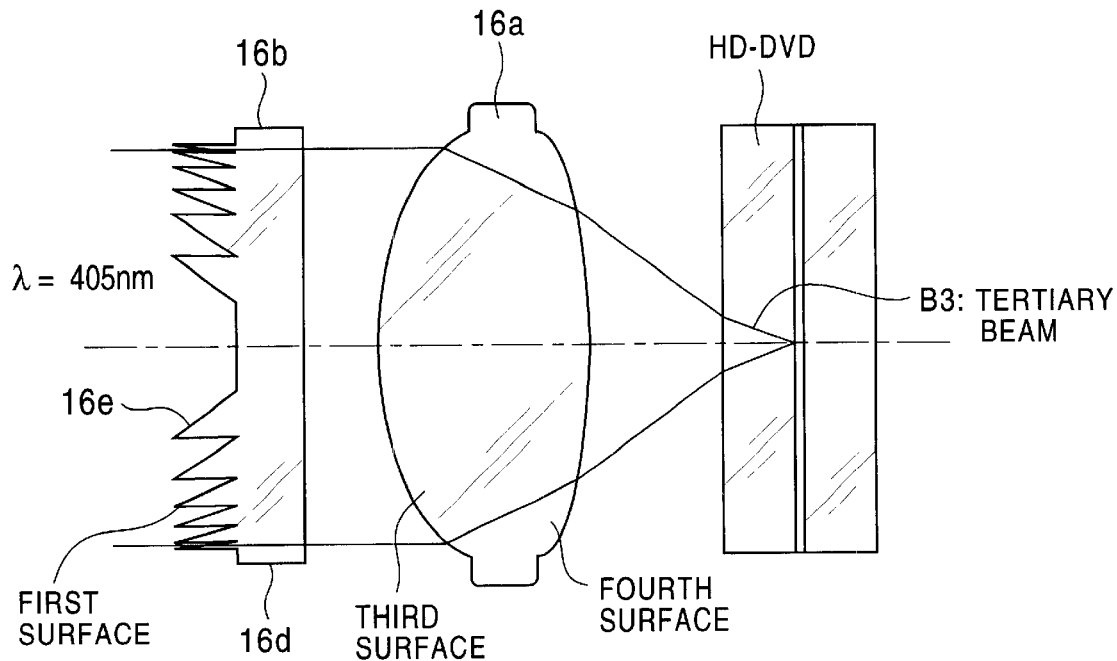
FIGS. 13A and 13B are cross-sectional views each illustrating an objective lens unit in an optical pickup according to a second embodiment of the present invention.
Figure 13B:
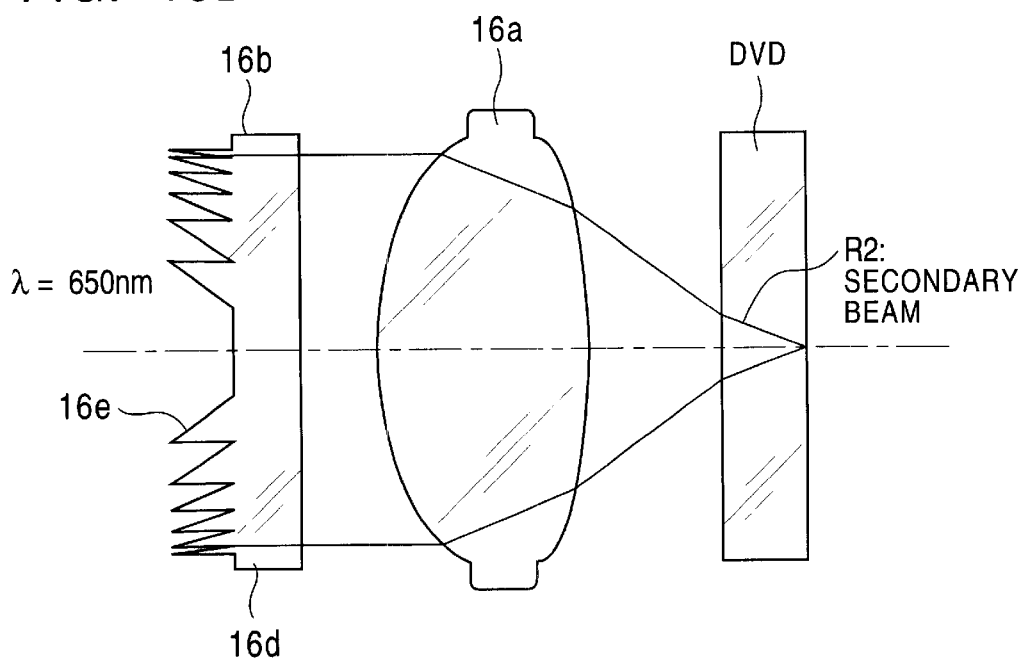

An optical pickup according to embodiment 2 was prepared as shown in FIGS. 13A and 13B. The optical pickup includes an objective lens unit in which a diffractive optical element 16b is designed to be separate from a condenser lens 16a and allow the diffraction grating elements to be symmetrical about the optical axis. Here, the diffractive optical element employs the tertiary diffracted beam B3 for blue (405 nm) and the secondary diffracted beam R2 for red (650 nm). The orbicular zone pattern of the diffraction grating is the same as that of the embodiment 1.

The data of the respective aspheric surfaces, which were automatically designed and prepared, are as shown in Tables 5–7.

TABLE 5

| | Surface No. | Radius of curvature | Surface interval | Refractive index |
|---|---|---|---|---|
| Diffractive optical element | 1 | −596.869760V | 1.000000 | 1.518981 |
| | 2 | — | 0.300000 | |
| Reference lens | 3 | 2.161390 | 1.798000 | 1.605257 |
| | 4 | −17.079390 | 1.000000 | |
| Disc substrate | 5 | — | 0.600000 | 1.621082 |
| | 6 | — | 0.876211V | |

TABLE 6

| | | First surface | Second surface | Third surface |
|---|---|---|---|---|
| Aspheric coefficient | AS2 | −0.001291 | −0.000738 | 0.008569 |
| | AS3 | 0.000262 | −0.000211 | −0.003385 |
| | AS4 | −9.5306e−05 | −0.000123 | 0.000760 |
| | AS5 | 4.8087e−06 | 2.9546e−06 | −6.4927e−05 |
| Cone index (K) | | −1.2380e+05 | −0.418560 | 17.362981 |

TABLE 7

| | First surface |
|---|---|
| DF0 | −0.000200 |
| DF1 | 0.000289 |
| DF2 | −0.000203 |
| DF3 | 3.7316e−05 |
| DF4 | −1.5262e−05 |
| DF5 | 7.8578e−07 |

Figure 14:
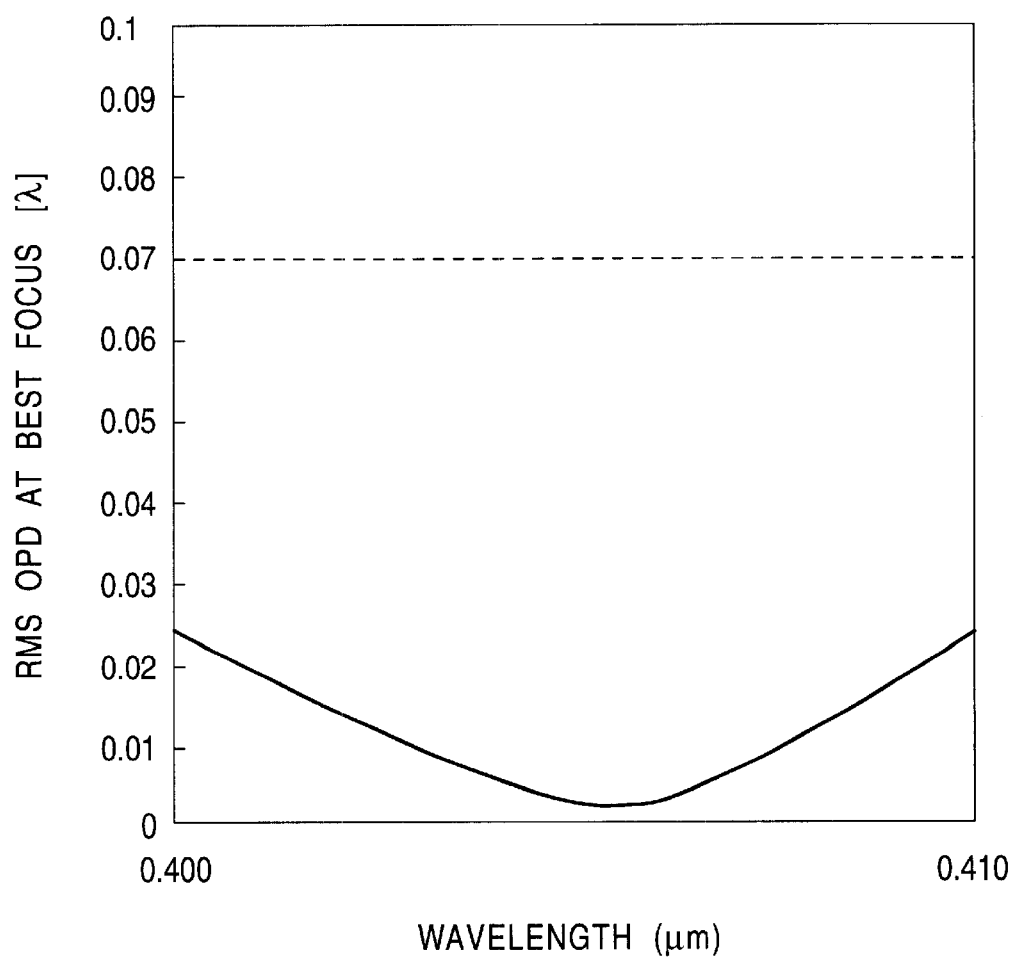
FIG. 14 is a plot illustrating a change in wave front aberration with respect to a first wavelength of tertiary diffracted light, provided by the objective lens unit according to the second embodiment.

FIG. 14 illustrates a variation in wave front aberration, resulted from the tertiary diffracted beam, of the resulting objective lens unit for the HD-DVD (with an optical disc 0.6 mm in thickness and a light source having a wavelength λ=405 nm +/−5 nm). The figure shows wavelength dependence with the horizontal axis representing the wavelength and the vertical axis representing the quantity of wave front aberration (rms (λ)) on the optical axis. As shown in the figure, the wave front aberration of the objective lens unit is limited to the Marechal's condition 0.07λ or less.

Figure 15:
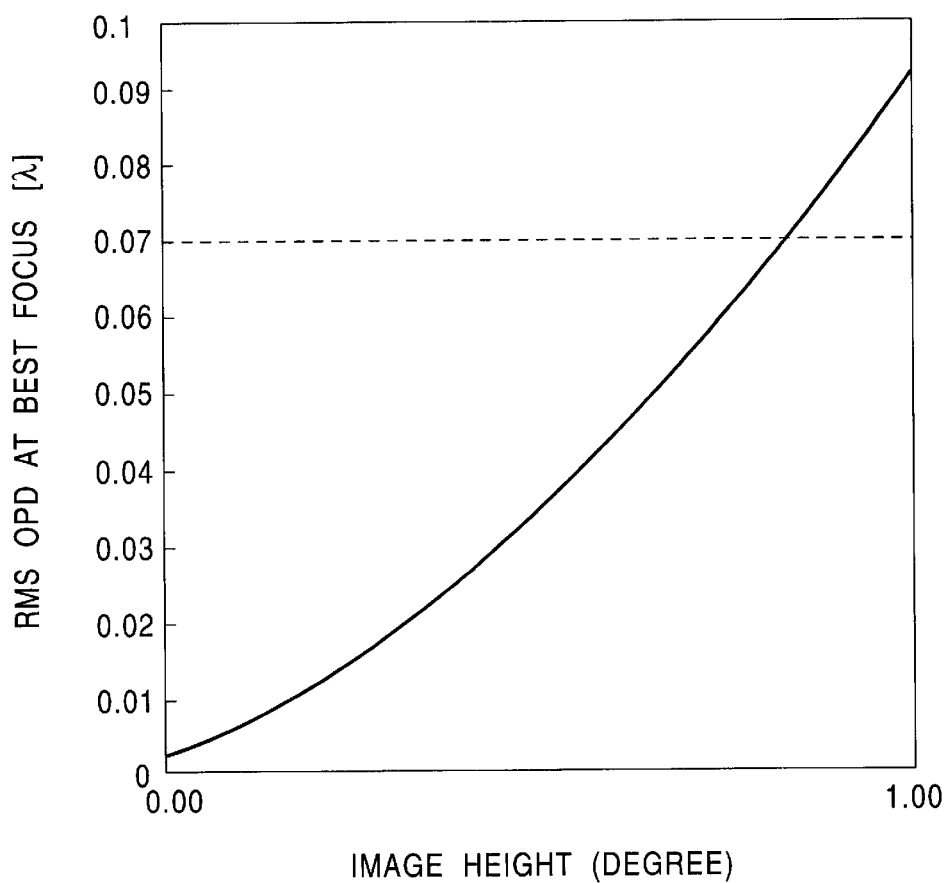
FIG. 15 is a plot illustrating a change in wave front aberration with respect to the angle of view of a first wavelength of tertiary diffracted light, provided by the objective lens unit according to the second embodiment.

FIG. 15 is a plot with the horizontal axis representing the angle of view and the vertical axis representing the wave front aberration for a single wavelength of 405 nm. As shown in the figure, the wave front aberration of the objective lens unit is limited to the Marechal's condition 0.07λ or less up to about 0.8 degrees of angle of view.

Figure 16:
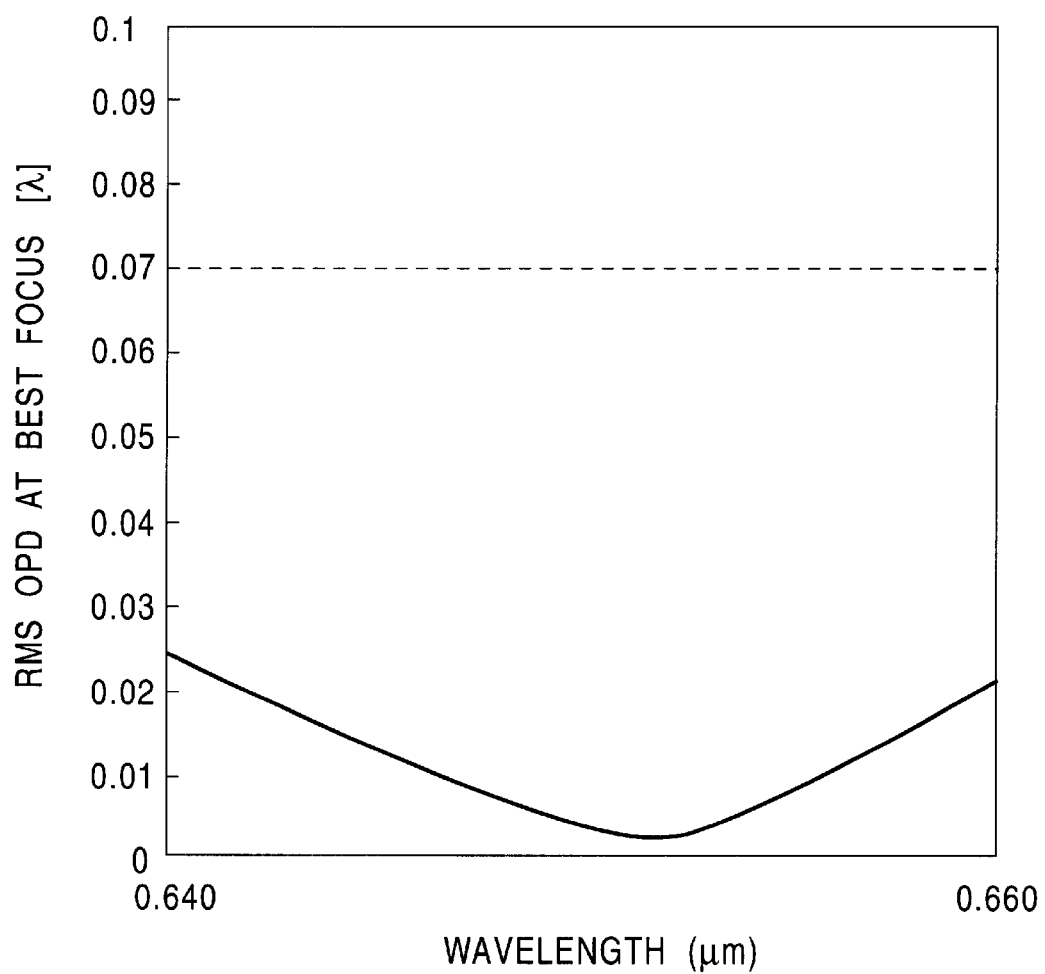
FIG. 16 is a plot illustrating a change in wave front aberration with respect to a second wavelength of secondary diffracted light, provided by the objective lens unit according to the second embodiment.

FIG. 16 shows a variation in wave front aberration, resulted from the secondary diffracted beam, of the resulting objective lens unit for the DVD (with an optical disc 0.6 mm in thickness and a light source having a wavelength λ=650 nm +/−10 nm). The figure shows wavelength dependence with the horizontal axis representing the wavelength and the vertical axis representing the quantity of wave front aberration (rms (λ)) on the optical axis. As shown in the figure, the wave front aberration of the objective lens unit is limited to the Marechal's condition 0.07λ or less.

FIG. 17 is a plot with the horizontal axis representing the angle of view and the vertical axis representing the wave front aberration for a single wavelength of 650 nm. As shown in the figure, the wave front aberration of the objective lens unit is limited to the Marechal's condition 0.07λ or less within one degree of angle of view.

Embodiment 3

Figure 18A:
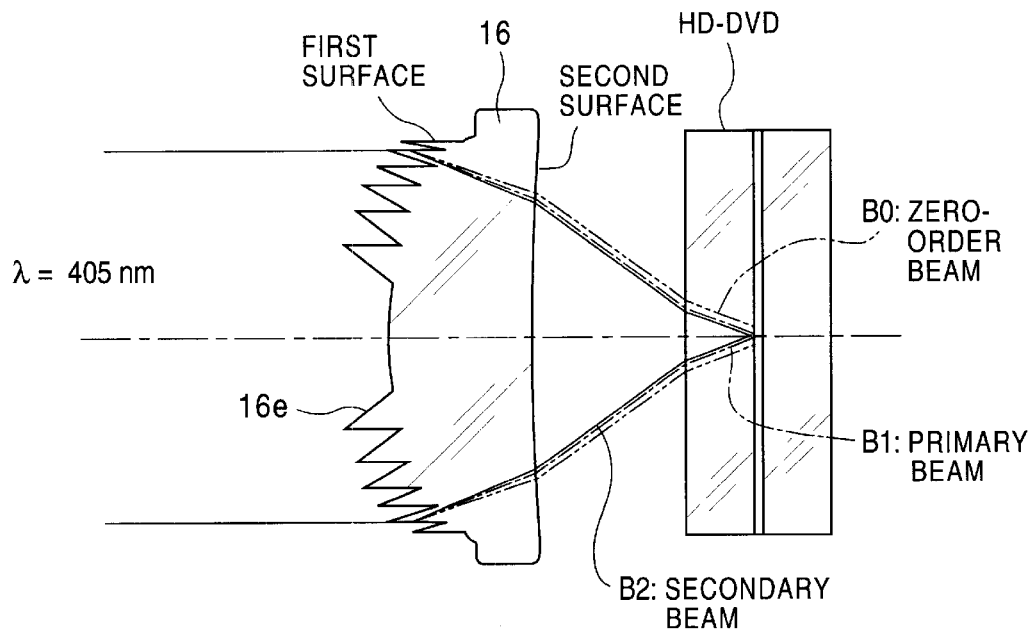
FIGS. 18A and 18B are cross-sectional views each illustrating an objective lens unit in an optical pickup according to a third embodiment of the present invention.
Figure 18B:
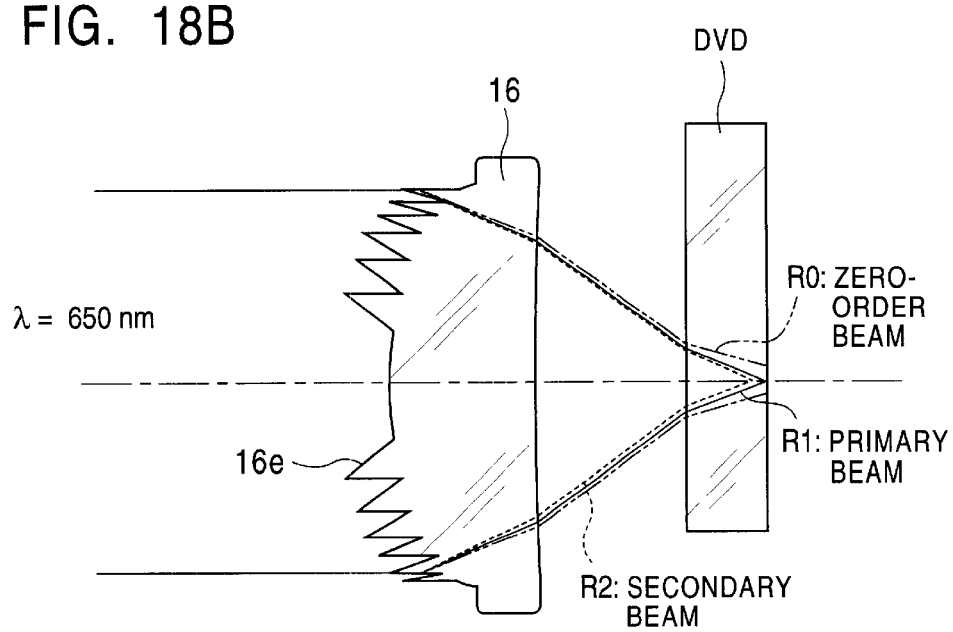

An optical pickup according to embodiment 3 was prepared as shown in FIGS. 18A and 18B. The optical pickup includes an objective lens unit 16 in which a diffractive optical element is designed to be integrated with a condenser lens and allow the diffraction grating to be symmetrical about the optical axis. Here, the diffractive optical element employs the secondary diffracted beam B2 for blue (405 nm) and the primary diffracted beam R1 for red (650 nm). The orbicular zone pattern of the diffraction grating is the same as that of the embodiment 1.

As shown in FIGS. 18A and 18B, a diffraction grating was formed on the incident surface, on the light source side, of an aspheric condenser lens, and the transmitting surfaces of both the diffraction grating and the condenser lens were formed in an aspheric shape. Accordingly, the first and second surfaces are the transmitting surfaces of the diffraction grating and the transmitting surface of the integrated condenser lens.

The data of the respective aspheric surfaces, which were automatically designed, are as shown in Tables 8–10.

TABLE 8

|  | Surface No. | Radius of curvature | Surface interval | Refractive index |
|---|---|---|---|---|
| Composite objective lens | 1 | 2.512042 V | 1.798000 | 1.605257 |
|  | 2 | 138.437197 V | 1.000000 |  |
| Disc substrate | 3 | — | 0.600000 | 1.621082 |
|  | 4 | — | 0.801256V |  |

TABLE 9

|  |  | First surface | Second surface |
|---|---|---|---|
| Aspheric coefficient | AS2 | −8.7996e−05 | −0.007221 |
|  | AS3 | 0.000417 | −0.001463 |
|  | AS4 | 2.3084e−05 | −0.000487 |
|  | AS5 | 1.8366e−06 | 5.7676e−05 |
| Cone index (K) |  | −0.441017 | −2.4545e+04 |

TABLE 10

|  | First surface |
|---|---|
| DF1 | −0.016154 |
| DF2 | −0.000703 |
| DF3 | 7.6145e−05 |
| DF4 | −1.1684e−05 |
| DF5 | −3.8137e−06 |

FIG. 19 illustrates a variation in wave front aberration of the resulting objective lens unit for the HD-DVD (with an optical disc 0.6 mm in thickness and a light source having a wavelength λ=405 nm +/−5 nm). The figure shows wavelength dependence with the horizontal axis representing the wavelength and the vertical axis representing the quantity of wave front aberration (rms (λ)) on the optical axis. As shown in the figure, the wave front aberration of the objective lens unit is limited to the Marechal's condition 0.07λ or less.

Figure 20:
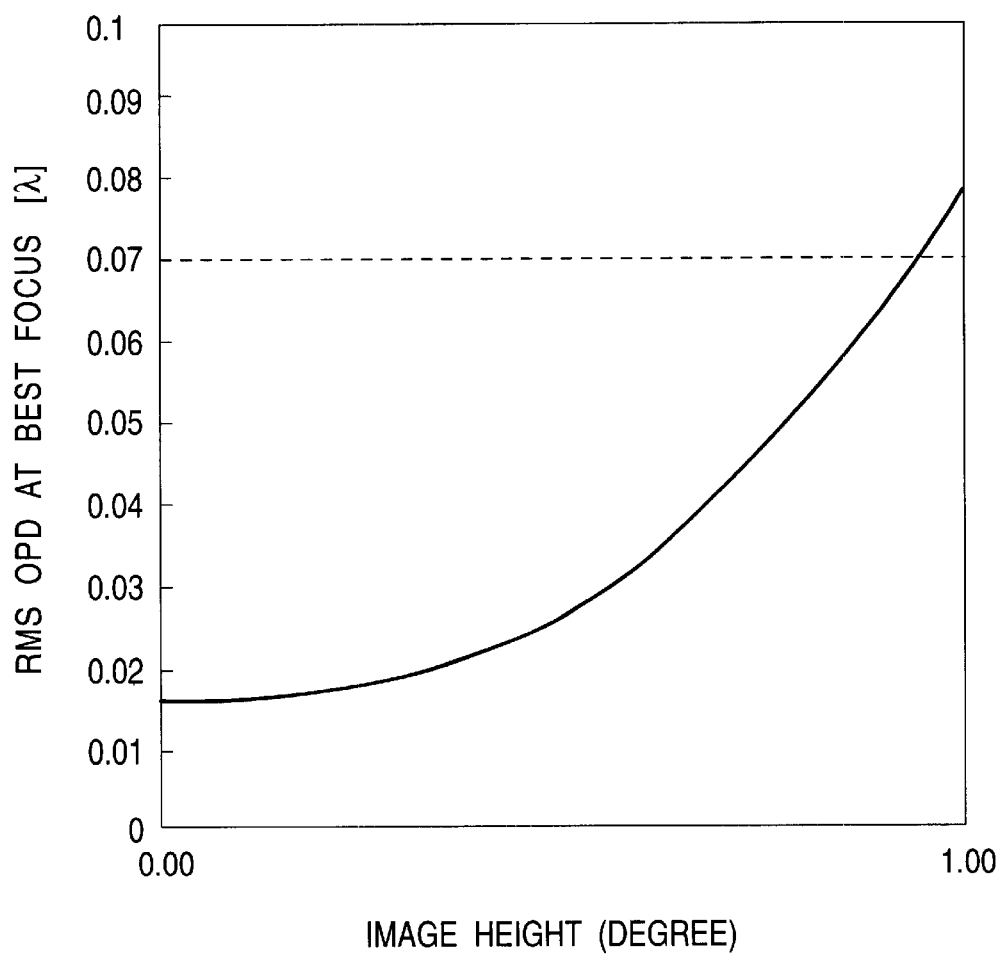
FIG. 20 is a plot illustrating a change in wave front aberration with respect to the angle of view of a first wavelength of secondary diffracted light, provided by the objective lens unit according to the third embodiment.

FIG. 20 is a plot with the horizontal axis representing the angle of view and the vertical axis representing the wave front aberration for a single wavelength of 405 nm. As shown in the figure, the wave front aberration of the objective lens unit is limited to the Marechal's condition 0.07λ or less up to about 0.95 degrees of angle of view.

Figure 21:
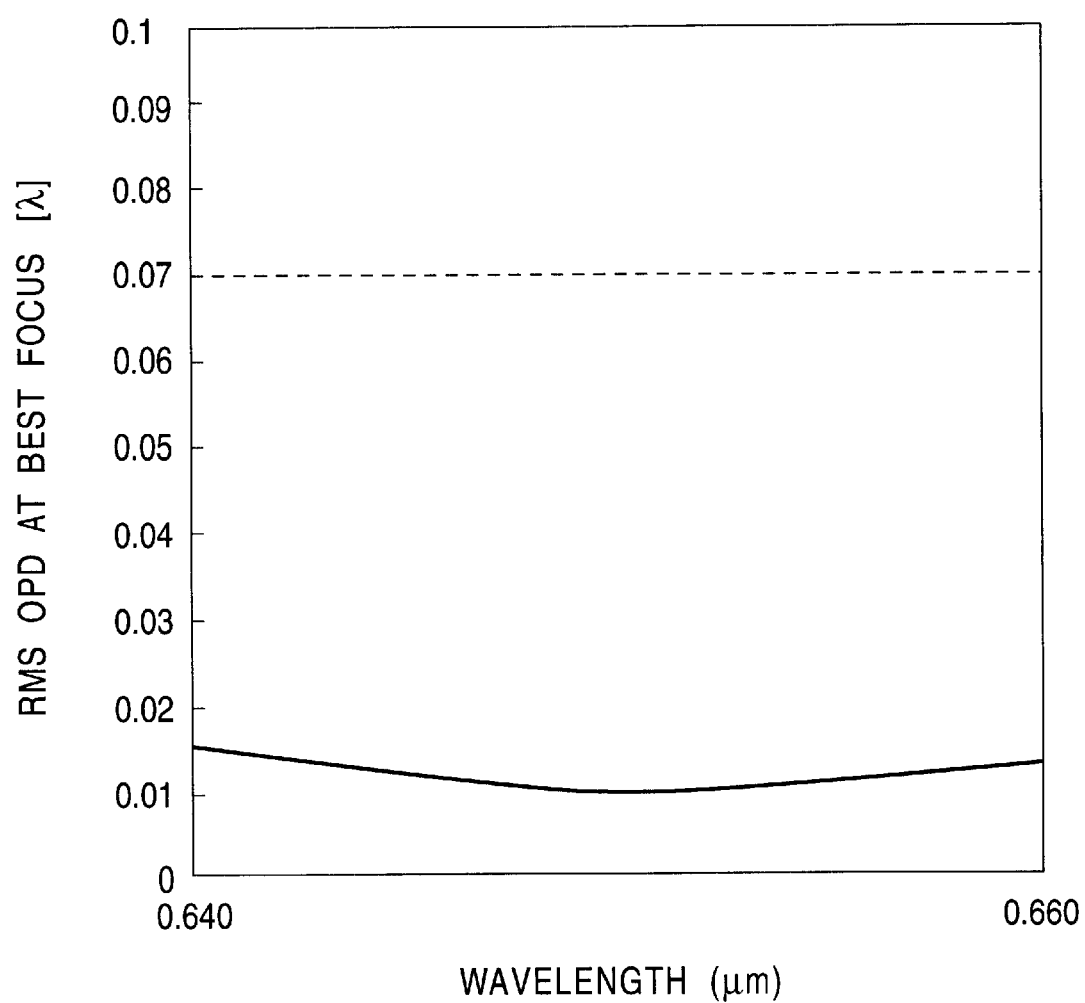
FIG. 21 is a plot illustrating a change in wave front aberration with respect to a second wavelength of primary diffracted light, provided by the objective lens unit according to the third embodiment.

FIG. 21 shows a variation in wave front aberration of the resulting objective lens unit for the DVD (with an optical disc 0.6 mm in thickness and a light source having a wavelength λ=650 nm +/−10 nm). The figure shows wavelength dependence with the horizontal axis representing the wavelength and the vertical axis representing the quantity of wave front aberration (rms (λ)) on the optical axis. As shown in the figure, the wave front aberration of the objective lens unit is limited to significantly below the Marechal's condition 0.07λ.

Figure 22:
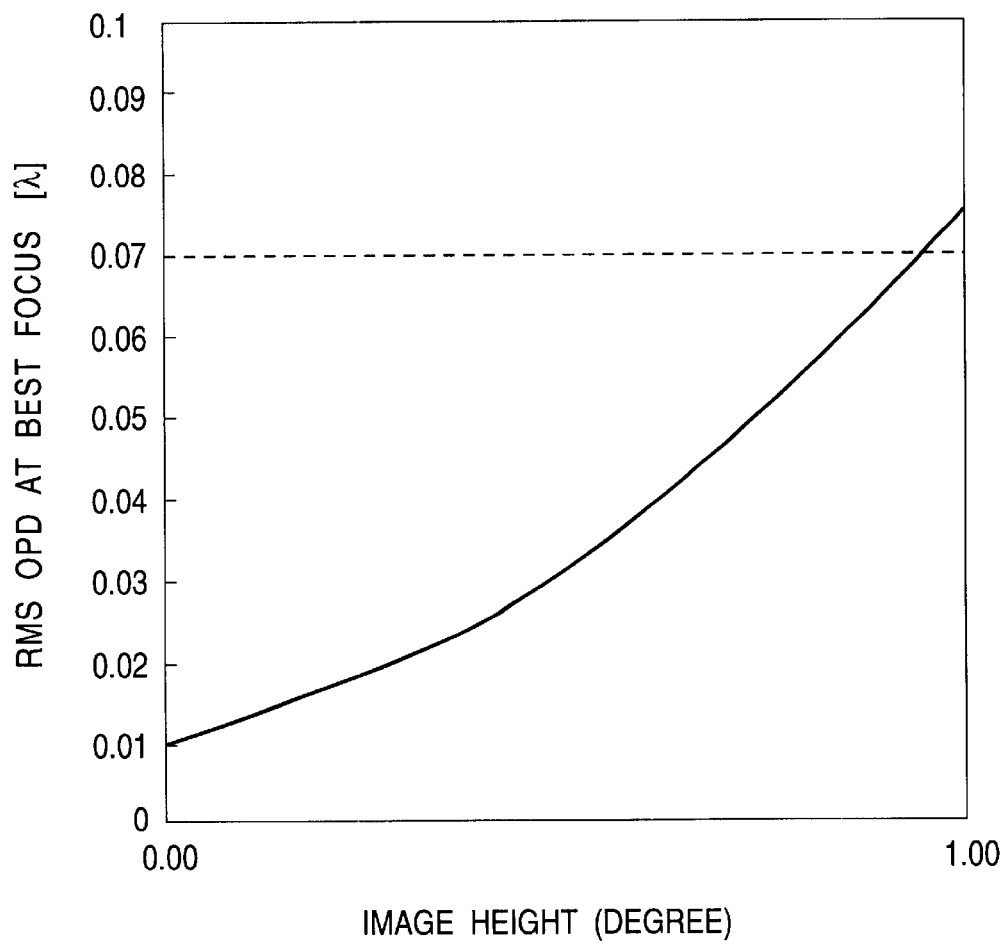
FIG. 22 is a plot illustrating a change in wave front aberration with respect to the angle of view of a second wavelength of primary diffracted light, provided by the objective lens unit according to the third embodiment.

FIG. 22 is a plot with the horizontal axis representing the angle of view and the vertical axis representing the wave front aberration for a single wavelength of 650 nm. As shown in the figure, the wave front aberration of the objective lens unit is limited to the Marechal's condition 0.07λ or less within 0.95 degrees of angle of view.

According to the present invention, the objective lens of the optical pickup is formed as a composite objective lens comprising a condenser lens and a diffractive optical element provided with an optically transparent diffraction grating having a plurality of protrusions and recesses as a corrugation. When the first beam of light passes through the diffractive optical element, the diffraction grating condenses the diffracted beam of the first diffraction order of the first beam of light as an information read beam or an information write beam via the condenser lens. In addition, when the second beam of light passes through the diffractive optical element, the diffraction grating condenses the diffracted beam of the second diffraction order of the second beam of light as an information read beam or an information write beam via the condenser lens. Here, the second diffraction order of the second beam of light is lower than the first diffraction order of the diffracted beam of the first beam of light. Thus, the present invention makes it possible to provide a miniaturized optical pickup that can read and write on the recording surface of optical discs that employ different wavelengths. As such, a diffraction grating is formed integrally or separately on an objective lens, thereby providing the following effects. That is, the objective lens and the diffractive optical element can be supported by means of the same holder and reduced in size, causing no problem to occur about the displacement of the lenses. The separate configuration requires rough positioning accuracy since the diffractive optical element causes almost no refraction. In other words, since the diffractive optical element only compensates for higher order aberration of both red and blue wavelengths in use, the positional relationship between the diffractive optical element and the objective lens requires a much rougher assembly compared with other methods. In particular, using a lens corrected in the wavelength range of blue or red as an objective lens would allow much rougher design.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An optical pickup comprising:
a first light source for emitting a first beam of light with a first wavelength;
a second light source for emitting a second beam of light with a second wavelength, wherein the second wavelength is longer than the first wavelength;
a condenser lens for condensing said first and second beam of light onto an information recording surface of a recording medium; and
a diffractive optical element having a corrugation arranged in an optical path from said first and second light source to said condenser lens, wherein the diffractive optical element diffracts said first and second beam of light to a first non-zero diffraction order of said first beam of light and a second non-zero diffraction order of said second beam of light, respectively,
wherein said condenser lens condenses the first beam of light of the first non-zero diffraction order and condenses the second beam of light of the second non-zero diffraction order, and wherein said second non-zero diffraction order is lower in order than said first non-zero diffraction order.

2. An optical pickup according to claim 1, wherein said diffractive optical element has the shape of saw teeth in cross section of the corrugation.

3. An optical pickup according to claim 1, wherein said diffractive optical element has the shape of steps in cross section of the corrugation.

4. An optical pickup according to claim 1, wherein the absolute value of said first non-zero diffraction order is greater by one than the absolute value of said second non-zero diffraction order where the absolute value of said second non-zero diffraction order is not less than one.

5. An optical pickup according to claim 4, wherein the second non-zero diffraction order is a primary diffracted beam of said second beam of light when the first non-zero diffraction order is a secondary diffracted beam of said first beam of light, or the second non-zero diffraction order is a secondary diffracted beam of said second beam of light when the first non-zero diffraction order is a tertiary diffracted beam of said first beam of light.

6. The optical pickup according to claim 1, wherein a depth of the corrugation of said diffractive optical element is between 1.22 and 1.62 micrometers or between 2.2 and 2.6 micrometers.

7. An optical pickup according to claim 1, wherein a pitch of the corrugation of said diffractive optical element is 20 micrometers or greater.

8. An optical pickup according to claim 1, wherein said first wavelength lies in a range of from 400 nm to 410 nm and said second wavelength lies in a range of from 630 nm to 660 nm.

9. An optical pickup according to claim 1, wherein said diffractive optical element comprises a plano-concave lens with a diffraction grating formed on the concave surface of the plano-concave lens.

10. An optical pickup according to claim 1, wherein said diffractive optical element is formed integrally with said condenser lens and the corrugation of said diffractive optical element is formed on a surface of said condenser lens, the surface being oriented towards the light sources.

* * * * *